(12) United States Patent
Traut et al.

(10) Patent No.: US 9,684,455 B2
(45) Date of Patent: Jun. 20, 2017

(54) METHOD AND APPARATUS FOR SEQUENTIAL STREAM I/O PROCESSING

(71) Applicant: Dot Hill Systems Corporation, Longmont, CO (US)

(72) Inventors: Zachary David Traut, Denver, CO (US); Michael David Barrell, Superior, CO (US)

(73) Assignee: Seagate Technology LLC, Cupertino, CA (US)

( * ) Notice: Subject to any disclaimer, the term of this patent is extended or adjusted under 35 U.S.C. 154(b) by 185 days.

(21) Appl. No.: 14/456,328

(22) Filed: Aug. 11, 2014

(65) Prior Publication Data

US 2014/0351527 A1 Nov. 27, 2014

Related U.S. Application Data

(63) Continuation-in-part of application No. 13/952,733, filed on Jul. 29, 2013, which is a continuation-in-part
(Continued)

(51) Int. Cl.
*G06F 3/06* (2006.01)
*G06F 12/0862* (2016.01)
*G06F 12/0866* (2016.01)

(52) U.S. Cl.
CPC ............ *G06F 3/061* (2013.01); *G06F 3/0656* (2013.01); *G06F 3/0659* (2013.01);
(Continued)

(58) Field of Classification Search
CPC ........................... G06F 3/0689; G06F 12/0862
See application file for complete search history.

(56) References Cited

U.S. PATENT DOCUMENTS

| 5,381,528 A | 1/1995 | Brunelle |
| 5,410,653 A | 4/1995 | Macon, Jr. et al. |

(Continued)

OTHER PUBLICATIONS

Official Action for U.S. Appl. No. 13/952,733, mailed May 20, 2015.
(Continued)

*Primary Examiner* — Charles Rones
*Assistant Examiner* — Tian-Pong Chang
(74) *Attorney, Agent, or Firm* — Thomas J. Lavan

(57) ABSTRACT

A method for providing efficient processing for many concurrent streams of sequential I/O requests is provided. In response to receiving an I/O request, the method includes determining if the I/O request corresponds to an active stream. If the request corresponds to an active stream, then the method includes updating an existing active list entry of an active list corresponding to the active stream, and if the I/O request does not correspond to an active stream, then instead converting and configuring an inactive list entry of an inactive list into a new active list entry. The inactive list stores available but unallocated resources, and the active list stores allocated resources. The active list includes a head at one end of the active list and a tail at an opposite end. The active list head corresponds to a most recently used entry, and the tail corresponds to a least recently used entry.

20 Claims, 19 Drawing Sheets

Related U.S. Application Data of application No. 13/952,749, filed on Jul. 29, 2013, now Pat. No. 9,053,038.

(60) Provisional application No. 61/772,266, filed on Mar. 4, 2013, provisional application No. 61/772,691, filed on Mar. 5, 2013.

(52) U.S. Cl.
CPC ........ *G06F 3/0689* (2013.01); *G06F 12/0862* (2013.01); *G06F 12/0866* (2013.01); *G06F 2212/6026* (2013.01)

(56) References Cited

U.S. PATENT DOCUMENTS

| | | | |
|---|---|---|---|
| 5,522,054 A | 5/1996 | Gunlock et al. |
| 5,557,767 A | 9/1996 | Sukegowa |
| 5,600,817 A | 2/1997 | Macon, Jr. et al. |
| 5,619,723 A | 4/1997 | Jones et al. |
| 5,640,530 A | 6/1997 | Beardsley et al. |
| 5,680,573 A | 10/1997 | Rubin et al. |
| 5,687,389 A | 11/1997 | Packer |
| 5,809,560 A | 9/1998 | Schneider |
| 6,047,359 A | 4/2000 | Fouts |
| 6,070,230 A | 5/2000 | Capps |
| 6,092,141 A | 7/2000 | Lange |
| 6,092,149 A | 7/2000 | Hicken et al. |
| 6,108,764 A | 8/2000 | Baumgartner et al. |
| 6,195,727 B1 | 2/2001 | Islam et al. |
| 6,226,713 B1 | 5/2001 | Mehrotra |
| 6,249,804 B1 | 6/2001 | Lam |
| 6,286,080 B1 | 9/2001 | Galbraith et al. |
| 6,321,300 B1 | 11/2001 | Ornes et al. |
| 6,338,115 B1 | 1/2002 | Galbraith et al. |
| 6,349,326 B1 | 2/2002 | Lam |
| 6,505,268 B1 | 1/2003 | Schultz et al. |
| 6,523,086 B1 | 2/2003 | Lee |
| 6,549,977 B1 | 4/2003 | Horst et al. |
| 6,567,892 B1 | 5/2003 | Horst et al. |
| 6,701,413 B2 | 3/2004 | Shirai et al. |
| 6,775,794 B1 | 8/2004 | Horst et al. |
| 6,785,771 B2 | 8/2004 | Ash et al. |
| 6,789,171 B2 | 9/2004 | Desai et al. |
| 6,842,792 B2 | 1/2005 | Johnson et al. |
| 6,877,065 B2 | 4/2005 | Galbraith et al. |
| 6,910,099 B1 | 6/2005 | Wang et al. |
| 6,915,404 B1 | 7/2005 | Desai et al. |
| 6,931,486 B2 | 8/2005 | Cavallo et al. |
| 6,965,966 B1 | 11/2005 | Rothberg et al. |
| 7,069,354 B2 | 6/2006 | Pooni et al. |
| 7,080,208 B2 | 7/2006 | Ashmore et al. |
| 7,120,753 B2 | 10/2006 | Accapadi et al. |
| 7,146,467 B2 | 12/2006 | Beardon et al. |
| 7,149,824 B2 | 12/2006 | Johnson |
| 7,216,203 B1 | 5/2007 | Bagwadi |
| 7,260,679 B2 | 8/2007 | Benhase et al. |
| 7,302,530 B2 | 11/2007 | Barrick et al. |
| 7,318,142 B2 | 1/2008 | Accapadi et al. |
| 7,337,262 B2 | 2/2008 | Beeston et al. |
| 7,493,450 B2 | 2/2009 | Beardon |
| 7,523,259 B2 | 4/2009 | Pistoulet |
| 7,543,124 B1 | 6/2009 | Accapadi et al. |
| 7,627,714 B2 | 12/2009 | Ash et al. |
| 7,664,785 B2 | 2/2010 | Kano |
| 7,721,043 B2 | 5/2010 | Gill et al. |
| 7,724,568 B2 | 5/2010 | Arya et al. |
| 7,779,174 B2 | 8/2010 | Lee et al. |
| 7,822,731 B1 * | 10/2010 | Yu ............... G06F 12/0862 |
| | | 707/705 |
| 7,853,751 B2 | 12/2010 | Manoj |
| 7,873,791 B1 * | 1/2011 | Yu ............... G06F 12/0862 |
| | | 711/137 |
| 7,996,623 B2 | 8/2011 | Walker |
| 8,074,020 B2 | 12/2011 | Seaman et al. |
| 8,255,627 B2 | 8/2012 | Blinick et al. |
| 8,356,126 B2 | 1/2013 | Ashmore |
| 8,478,945 B2 | 7/2013 | Ash et al. |
| 8,700,854 B2 | 4/2014 | Ash et al. |
| 8,788,742 B2 | 7/2014 | Benhase et al. |
| 8,788,755 B2 | 7/2014 | Satran et al. |
| 8,799,571 B1 | 8/2014 | Desroches et al. |
| 8,806,122 B2 | 8/2014 | Benhase et al. |
| 2002/0069322 A1 | 6/2002 | Galbraith et al. |
| 2003/0041214 A1 | 2/2003 | Hirao et al. |
| 2003/0200404 A1 | 10/2003 | Wicki et al. |
| 2003/0225977 A1 | 12/2003 | Desai et al. |
| 2004/0205298 A1 | 10/2004 | Beardon et al. |
| 2004/0205299 A1 | 10/2004 | Beardon |
| 2005/0021879 A1 | 1/2005 | Douglas |
| 2005/0060495 A1 | 3/2005 | Pistoulet |
| 2005/0071596 A1 | 3/2005 | Aschoff et al. |
| 2005/0235108 A1 | 10/2005 | Hiratsuka |
| 2005/0235125 A1 | 10/2005 | Accapadi et al. |
| 2006/0020759 A1 | 1/2006 | Barrick et al. |
| 2006/0069876 A1 | 3/2006 | Bansal et al. |
| 2006/0248278 A1 | 11/2006 | Beeston et al. |
| 2006/0248387 A1 | 11/2006 | Nicholson et al. |
| 2006/0288186 A1 | 12/2006 | Accapadi et al. |
| 2006/0294330 A1 * | 12/2006 | Stanfill ............ G06F 12/123 |
| | | 711/159 |
| 2007/0005904 A1 | 1/2007 | Lemoal et al. |
| 2007/0239747 A1 | 10/2007 | Pepper |
| 2007/0276993 A1 | 11/2007 | Hirutsaka |
| 2008/0005481 A1 | 1/2008 | Walker |
| 2008/0301256 A1 * | 12/2008 | McWilliams ....... G06F 12/0284 |
| | | 709/214 |
| 2009/0219760 A1 | 9/2009 | Arya et al. |
| 2010/0016283 A1 | 7/2010 | Alturi et al. |
| 2010/0169283 A1 | 7/2010 | Atluri et al. |
| 2010/0208385 A1 | 8/2010 | Toukarin |
| 2011/0145508 A1 | 6/2011 | Pelleg et al. |
| 2012/0047548 A1 | 2/2012 | Rowlands et al. |
| 2012/0144123 A1 | 6/2012 | Aronovich et al. |
| 2013/0326149 A1 | 12/2013 | Barrell et al. |
| 2014/0181415 A1 | 6/2014 | Loh et al. |
| 2014/0250268 A1 | 9/2014 | Traut et al. |
| 2014/0258638 A1 | 9/2014 | Traut et al. |
| 2015/0134857 A1 * | 5/2015 | Hahn ............... G06F 3/061 |
| | | 710/5 |
| 2015/0169449 A1 | 6/2015 | Barrell et al. |
| 2015/0169450 A1 | 6/2015 | Traut et al. |

OTHER PUBLICATIONS

Notice of Allowance dated Oct. 7, 2014 for U.S. Appl. No. 13/482,314.

Notice of Allowance dated Oct. 30, 2014 for U.S. Appl. No. 14/465,291.

* cited by examiner

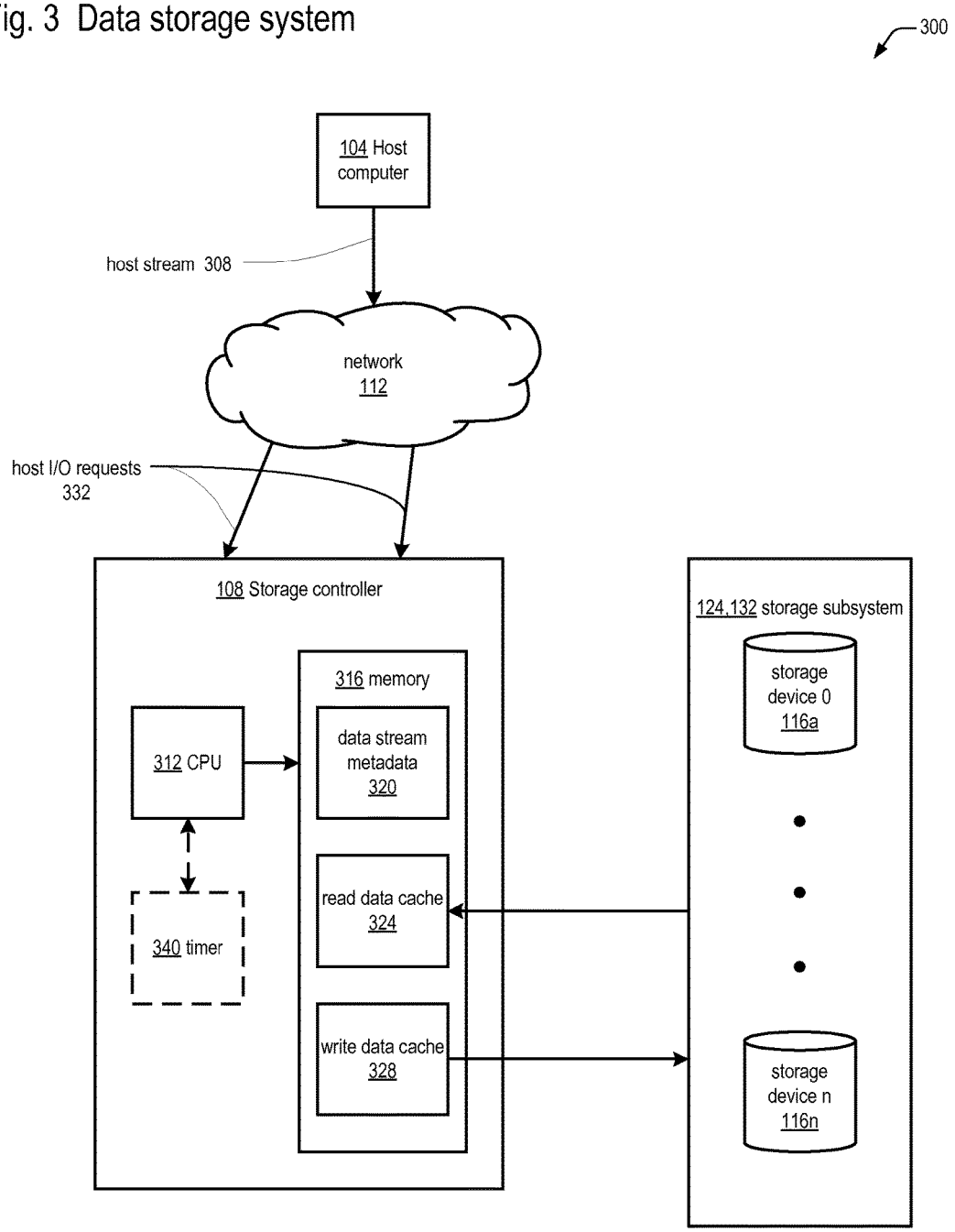

Fig. 4 Host data stream
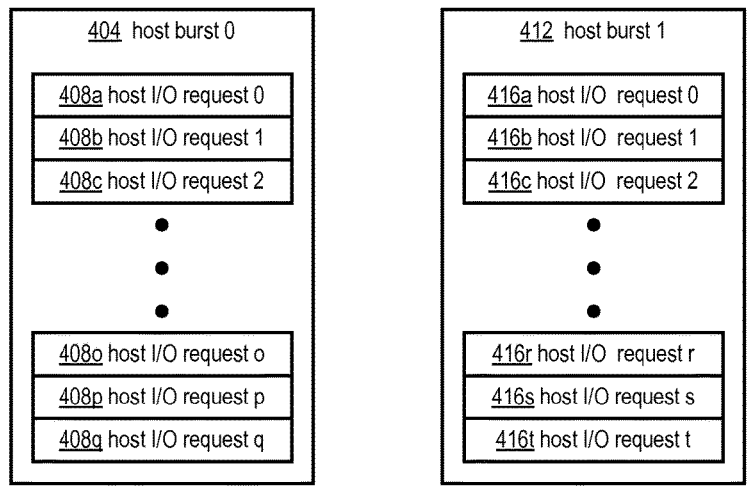
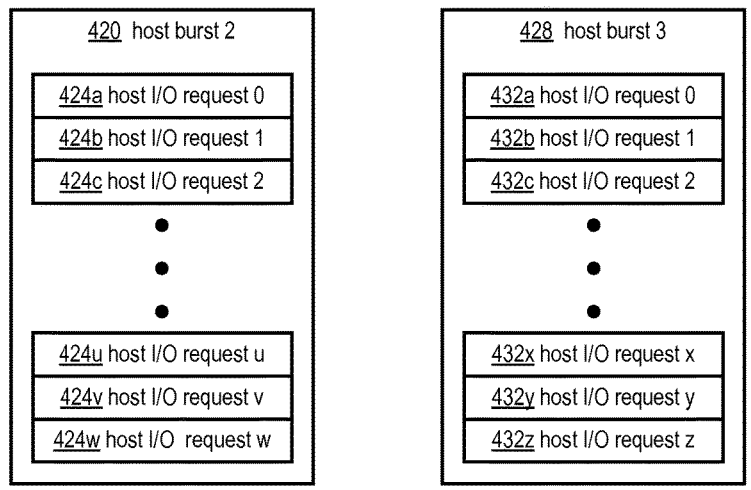
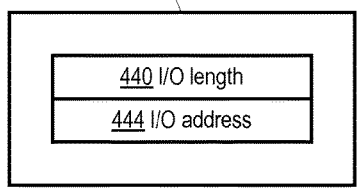

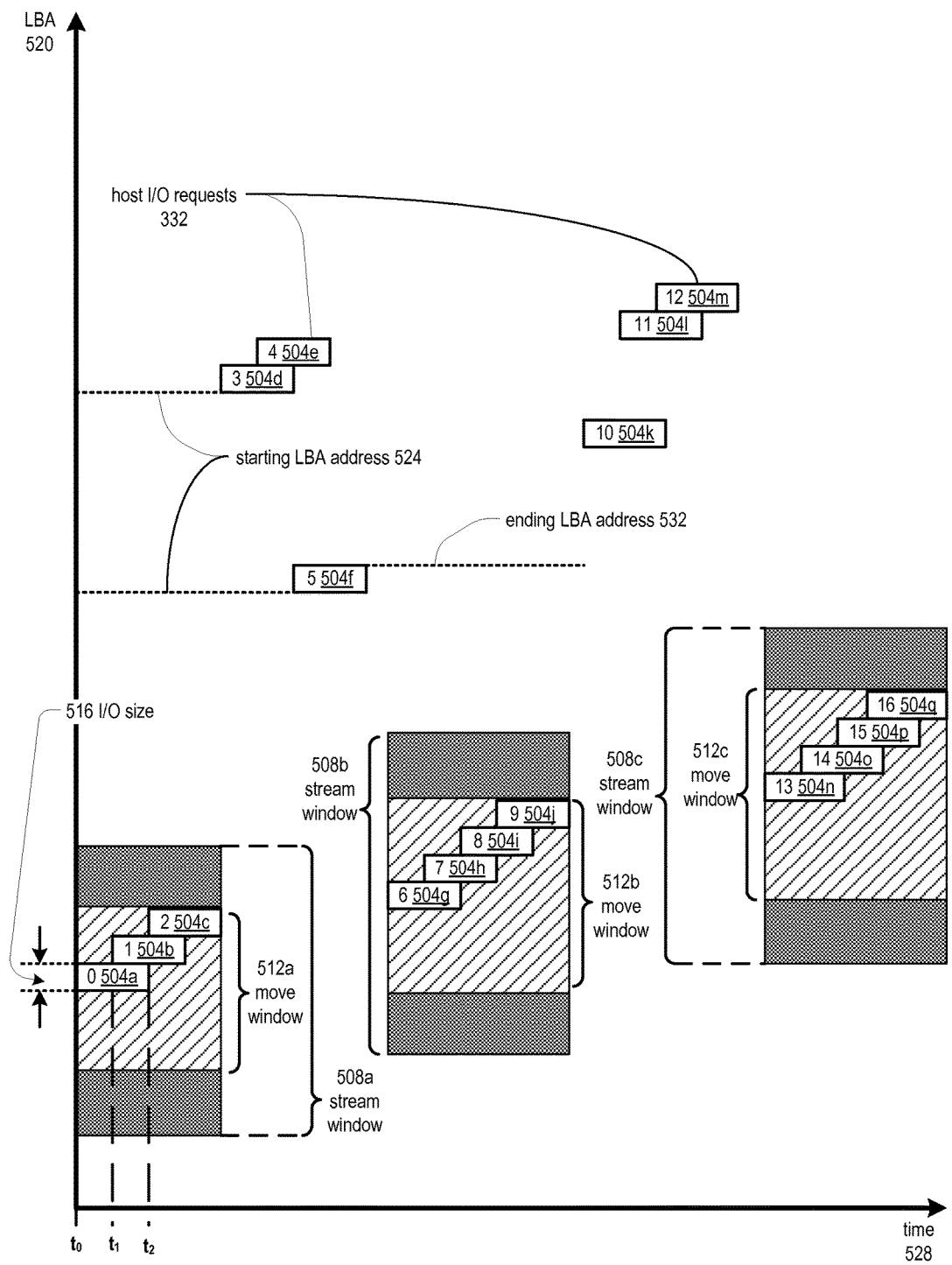

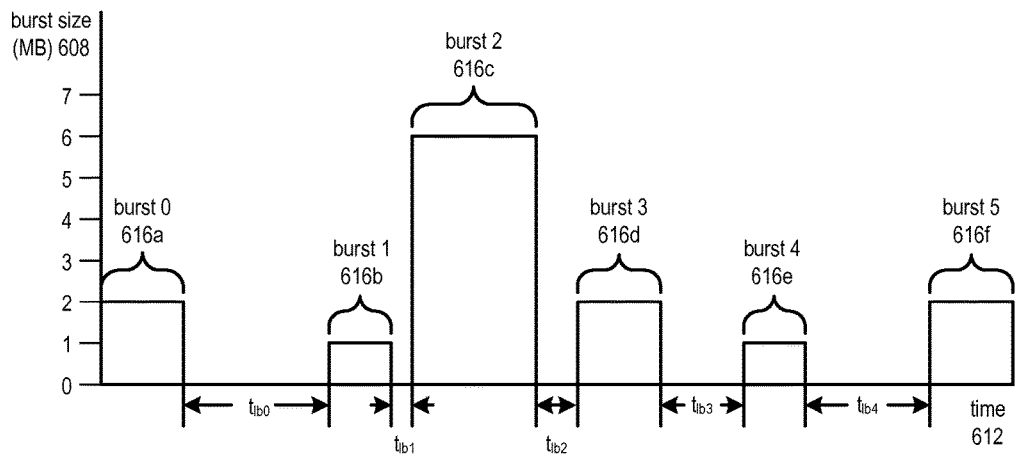

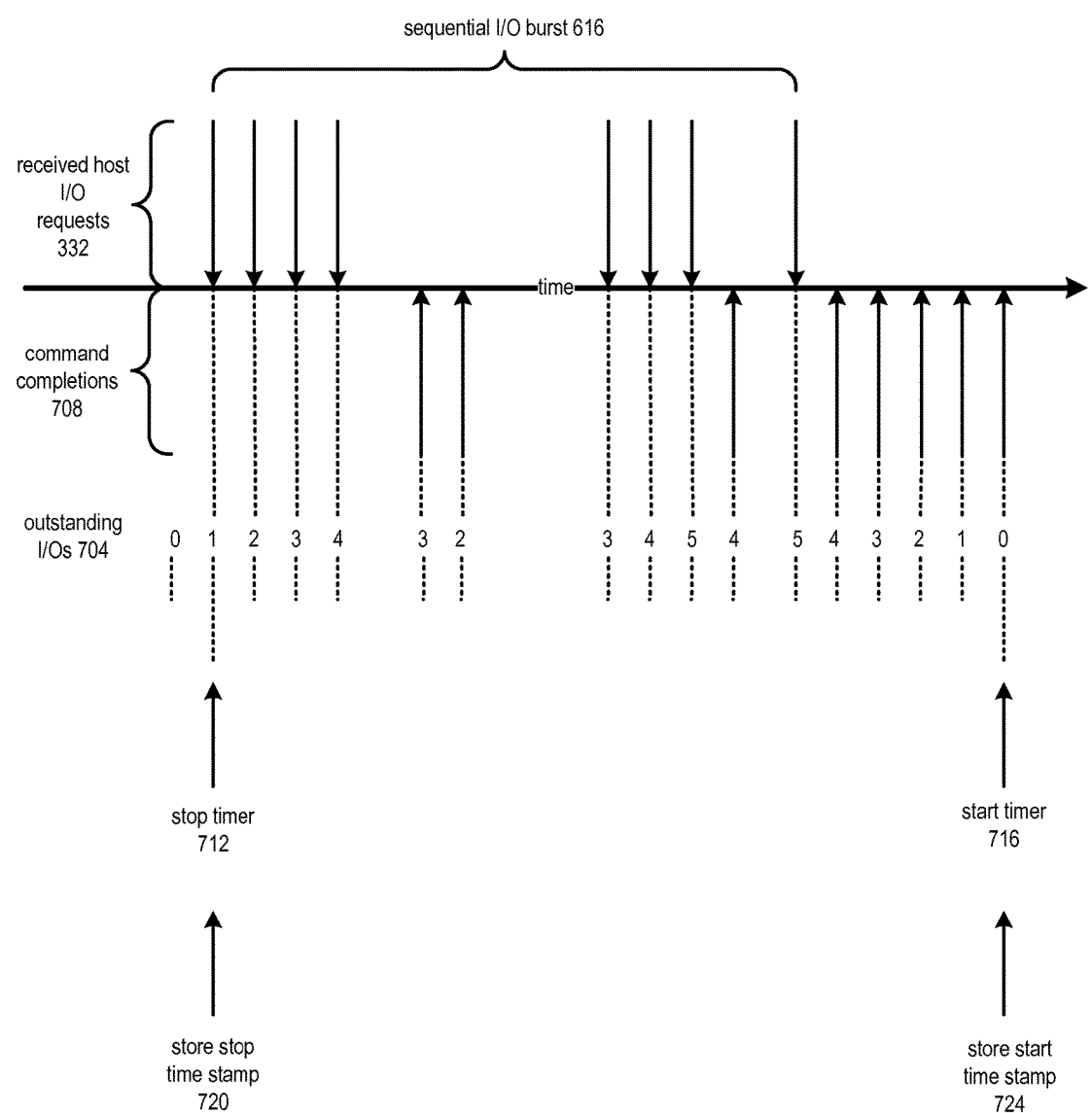

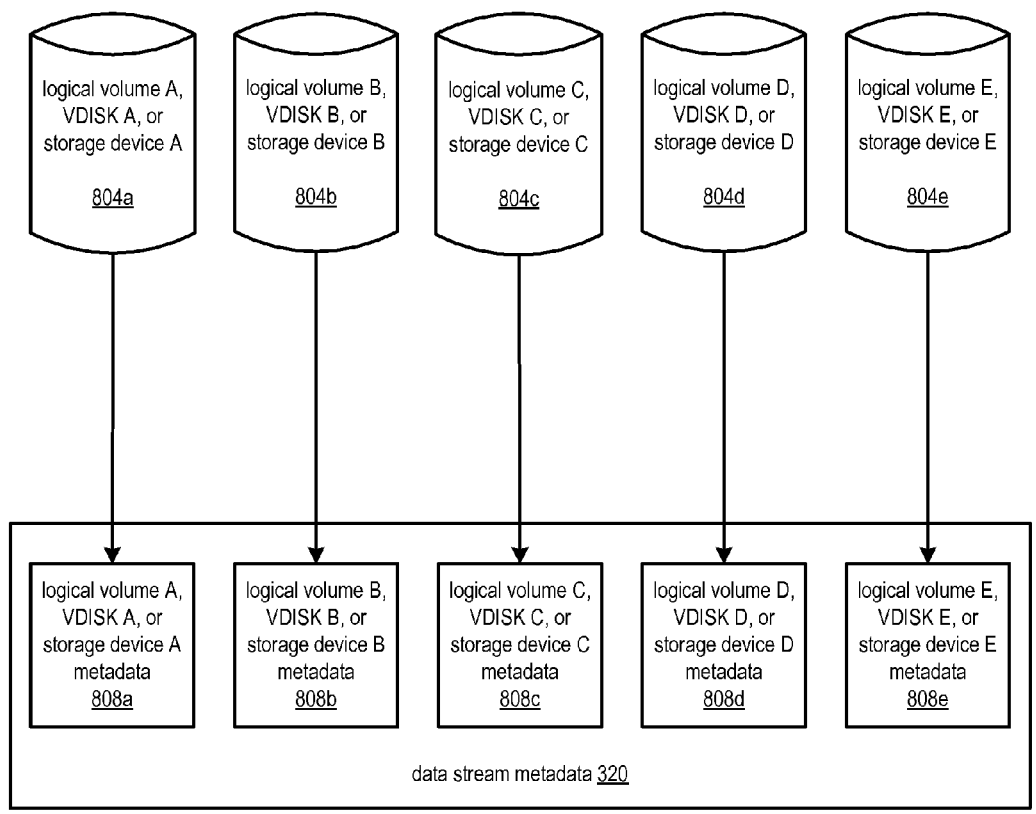
Fig. 8 Logical volume, VDISK, and storage device metadata

Fig. 9a Active and inactive lists
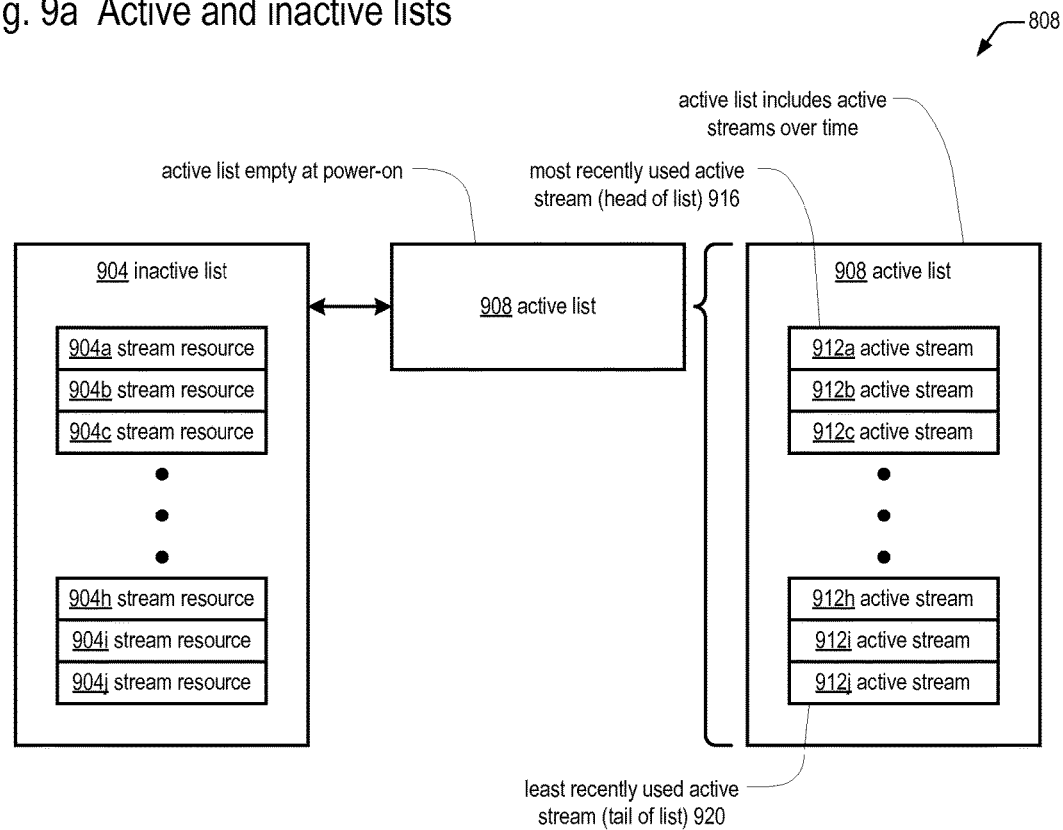
Fig. 9b Stream metadata
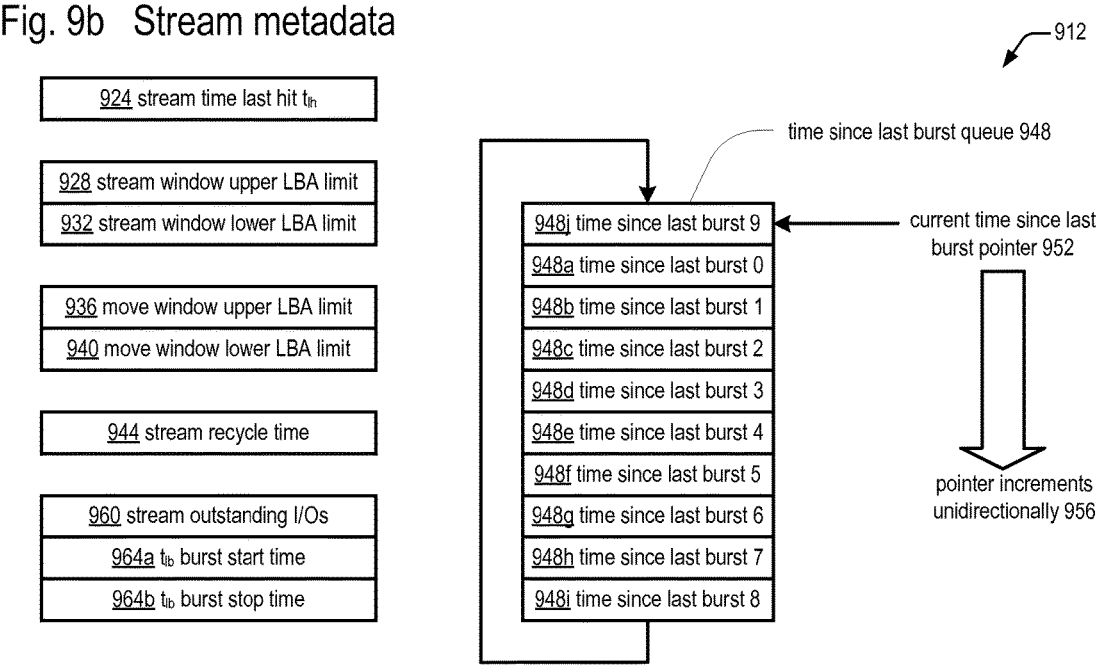

Fig. 10 Initialization process
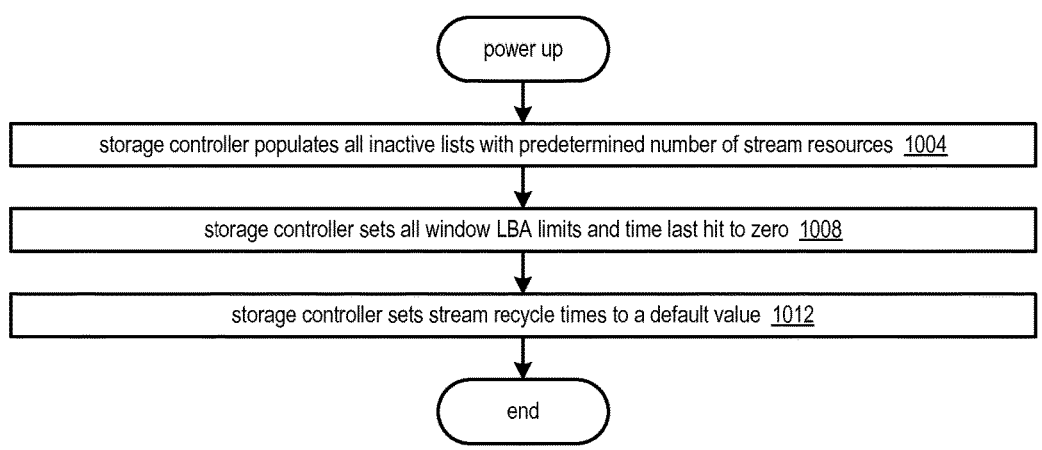

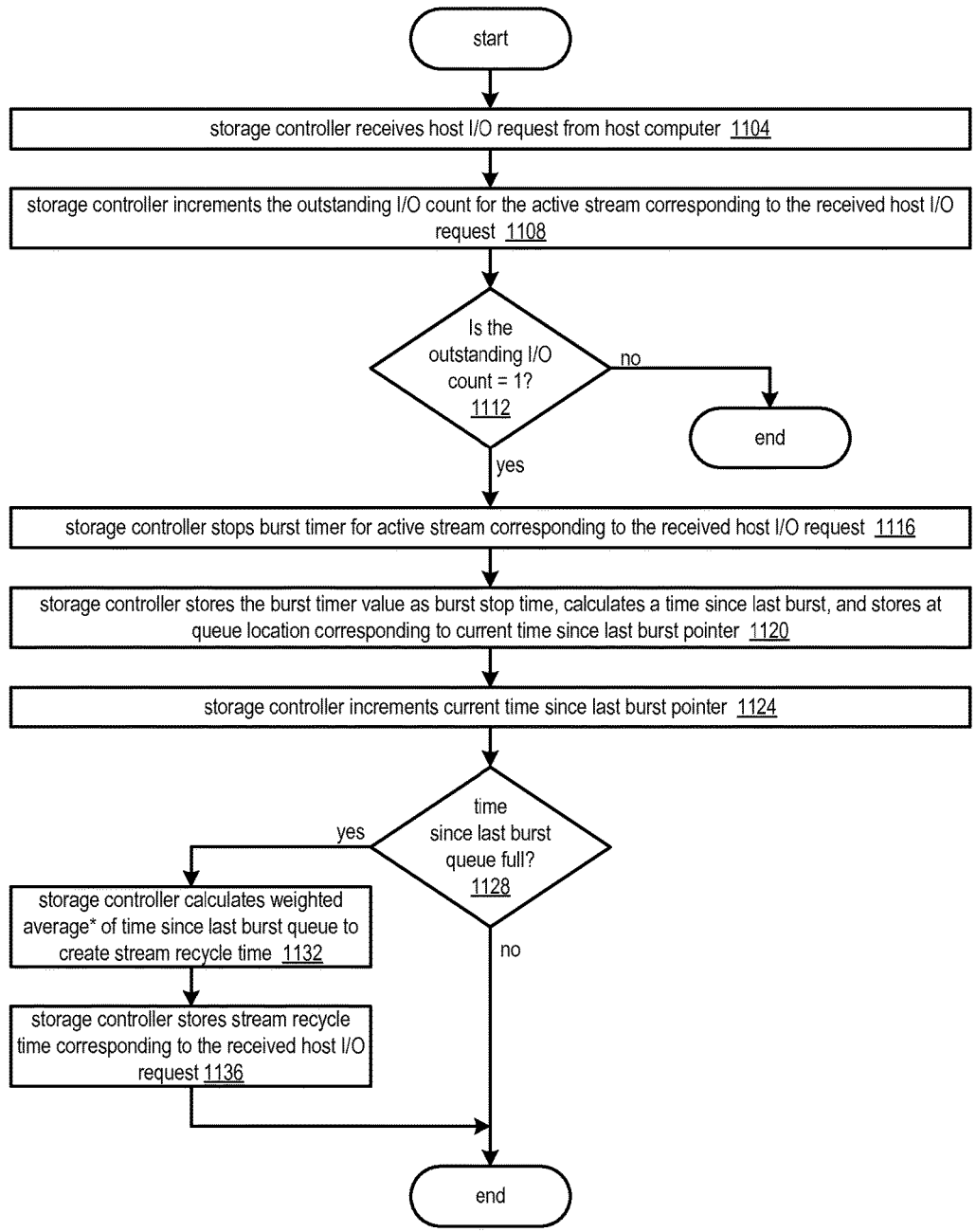
Fig. 11 New I/O request update process

Fig. 12 Command completion process
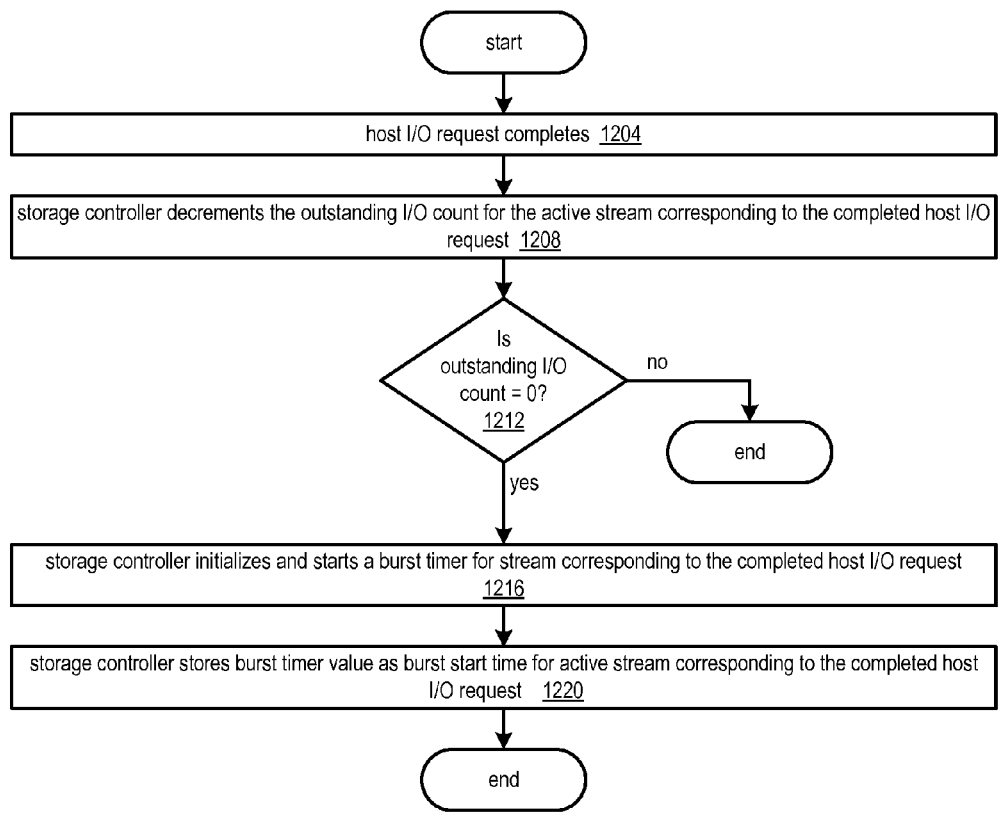

Fig. 13 I/O request update process
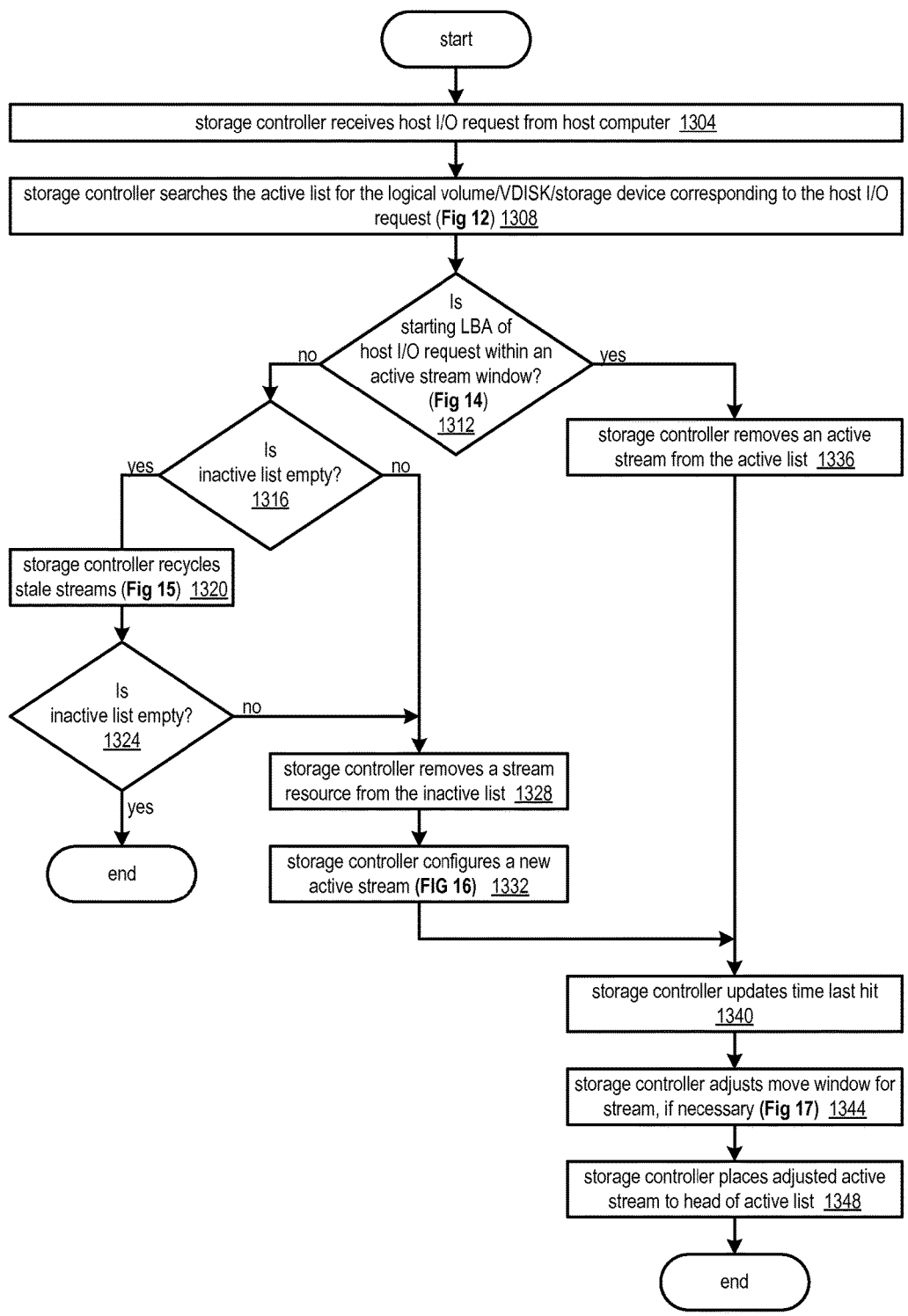

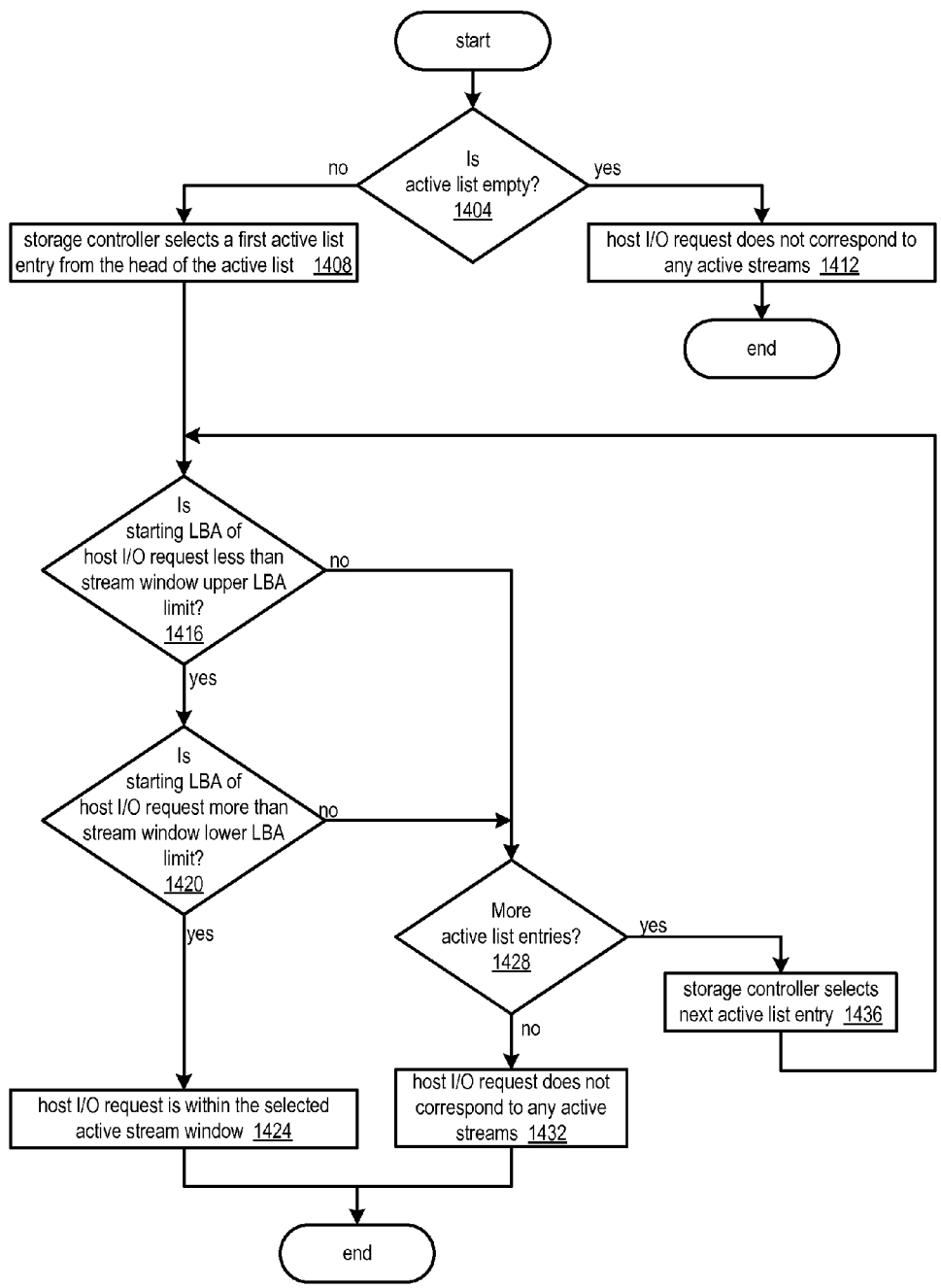
Fig. 14 Stream association process

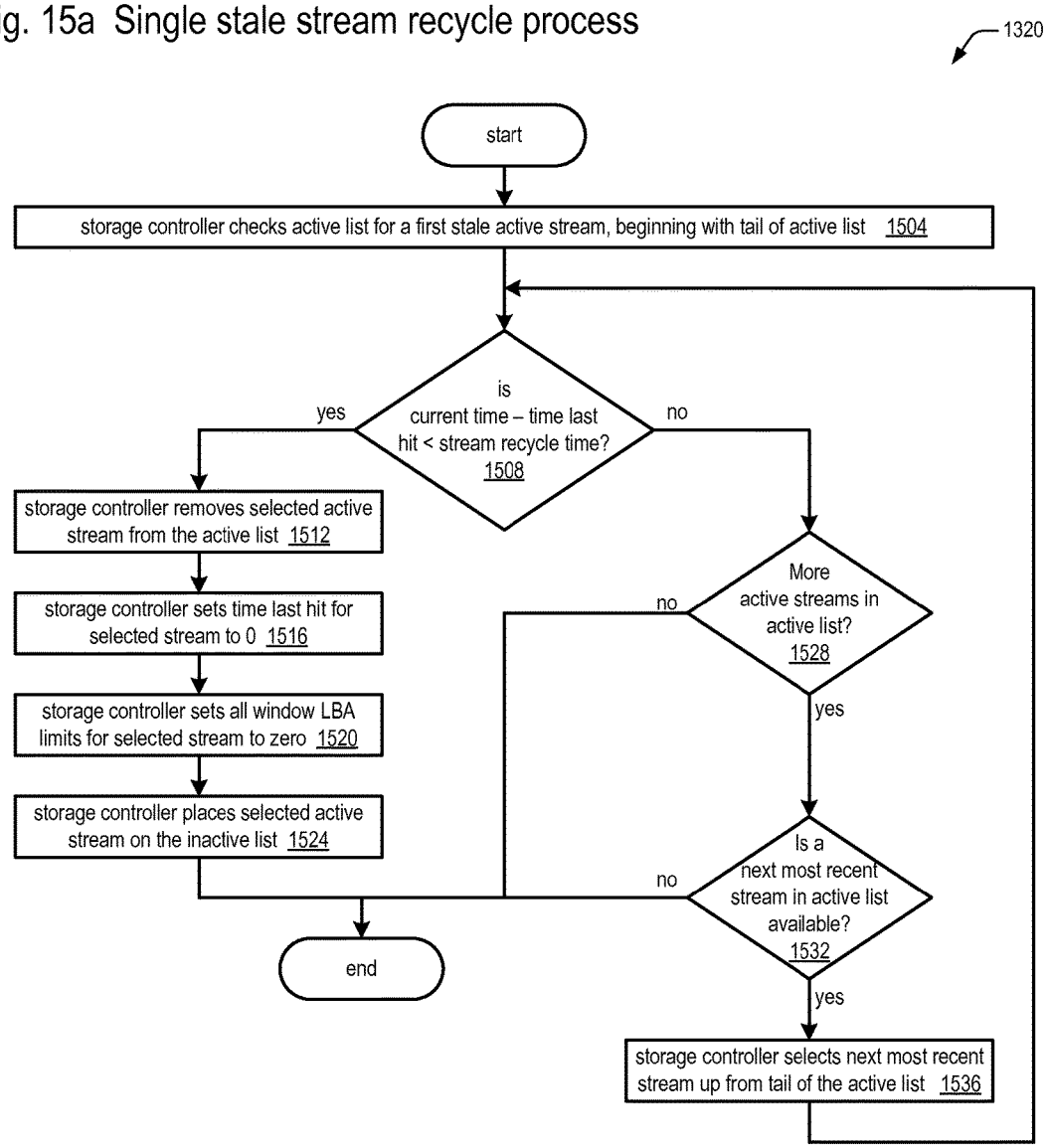
Fig. 15a Single stale stream recycle process

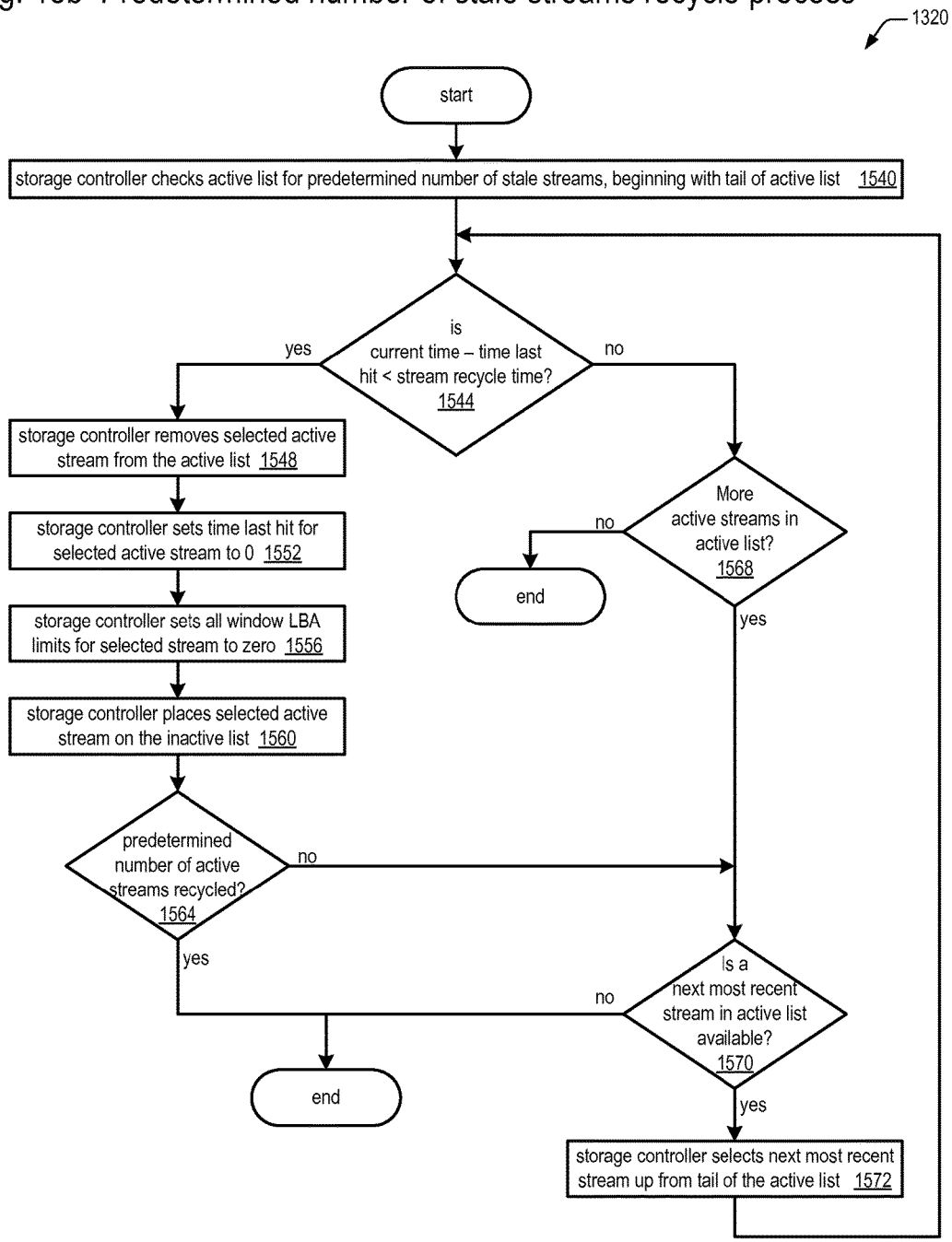
Fig. 15b Predetermined number of stale streams recycle process

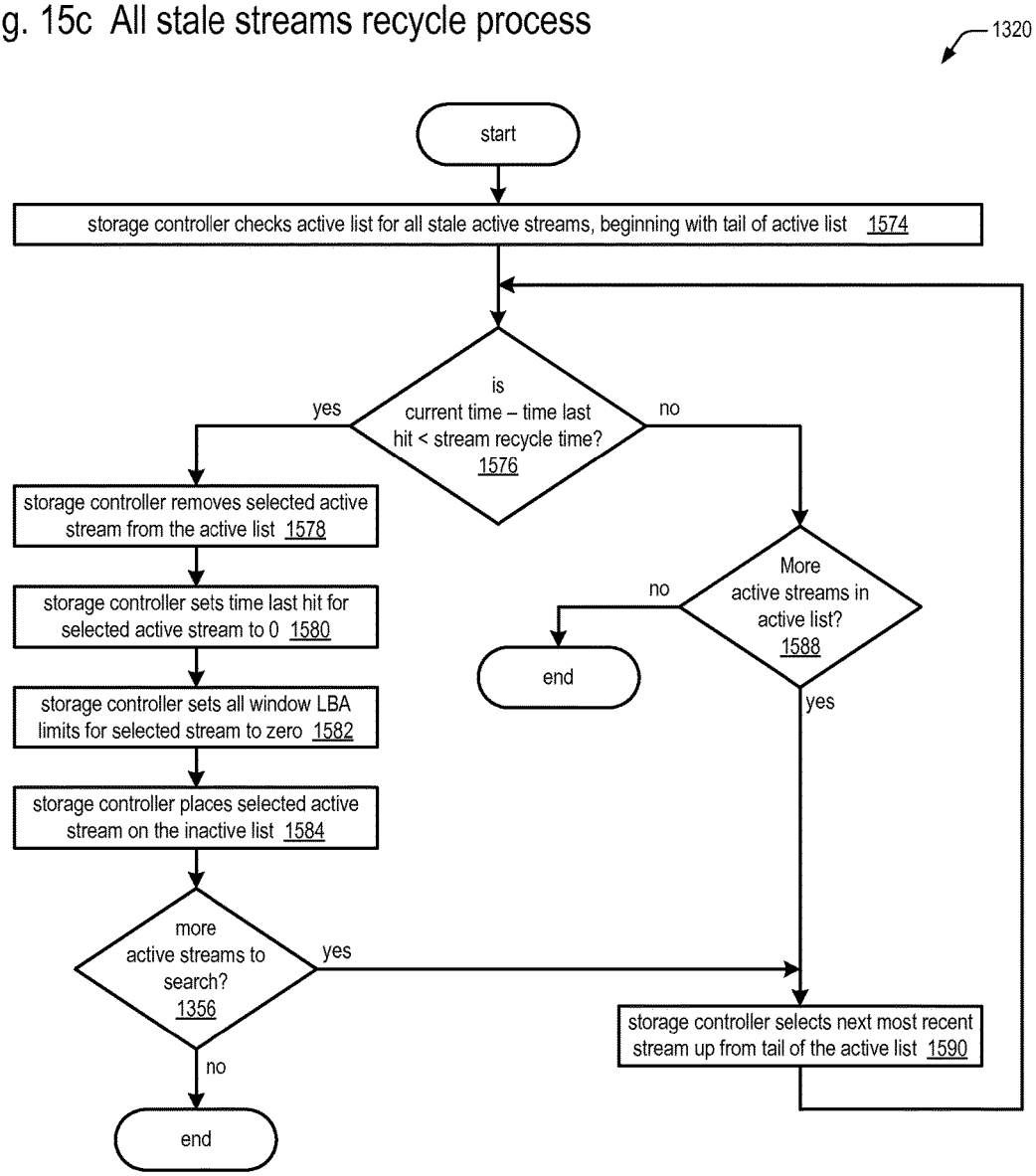
Fig. 15c All stale streams recycle process

Fig. 16 Active stream configuration process
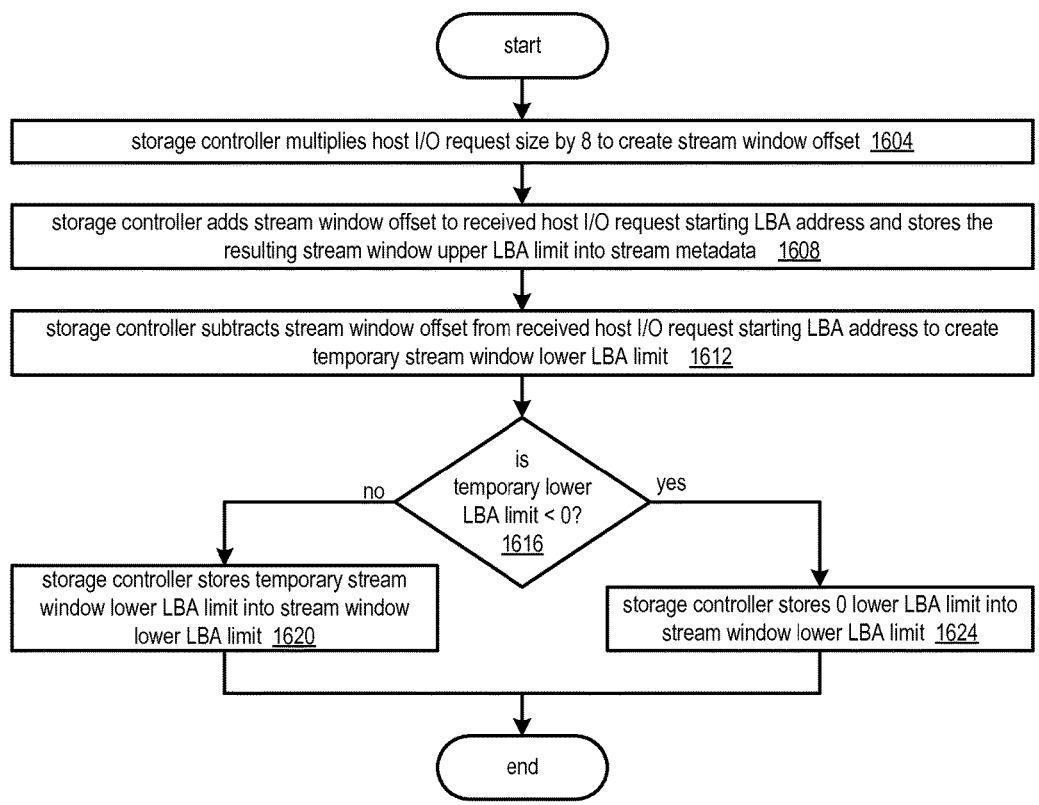

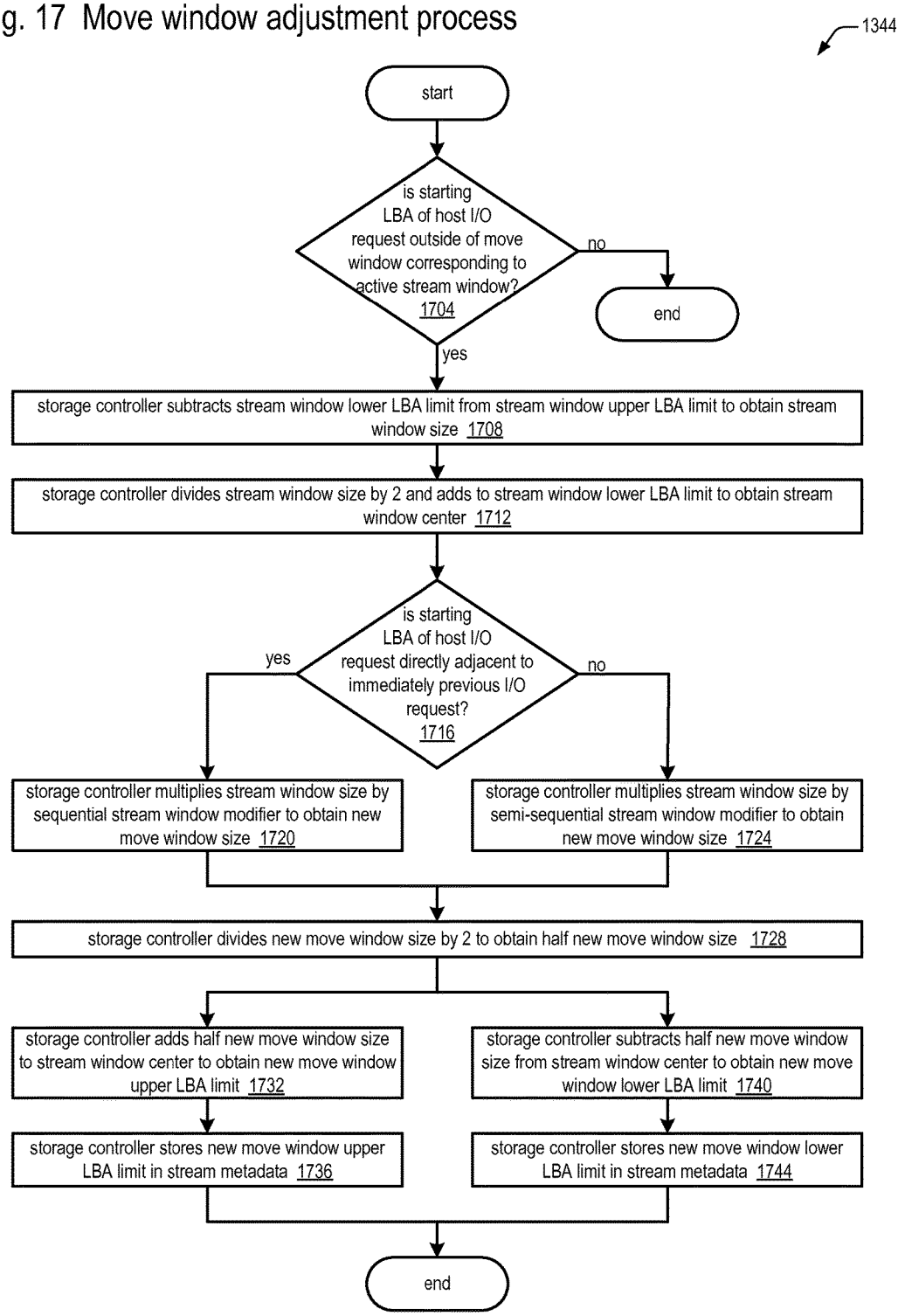

METHOD AND APPARATUS FOR SEQUENTIAL STREAM I/O PROCESSING

CROSS REFERENCE TO RELATED APPLICATION(S)

This application is a Continuation-in-Part of pending non-Provisional U.S. application Ser. No. 13/952,733 filed Jul. 29, 2013, entitled METHOD AND APPARATUS FOR EFFICIENT CACHE READ AHEAD, which claims the benefit of U.S. Provisional Application Ser. No. 61/772,266 filed Mar. 4, 2013, and is also a Continuation-in-Part of pending non-Provisional U.S. application Ser. No. 13/952,749 filed Jul. 29, 2013, entitled METHOD AND APPARATUS FOR EFFICIENT READ CACHE OPERATION, which claims the benefit of U.S. Provisional Application Ser. No. 61/772,691 filed Mar. 5, 2013, each of which is hereby incorporated by reference for all purposes. This application is related to pending non-Provisional U.S. application Ser. No. 13/964,162, filed Aug. 12, 2013, entitled METHOD AND APPARATUS FOR EFFICIENT PROCESSING OF DISPARATE DATA STORAGE COMMANDS.

FIELD

The present invention is directed to computer data storage. In particular, the present invention is directed to methods and apparatuses for efficient storage controller memory usage for sequential I/O streams.

BACKGROUND

The need to store digital files, documents, pictures, images and other data continues to increase rapidly. In connection with the electronic storage of data, systems incorporating one or more data storage controllers have been devised. Storage controllers receive data read and write requests from host computers and control one or more physical storage devices to beneficially store or provide the requested data from/to the host computers.

Storage controllers generally buffer read and write data requests, often converting the host data read and write requests into RAID or storage device read or write requests. Many storage controllers store read and write data in cache memories included as part of the storage controllers. Cache memories are small compared to external storage devices such as hard drives, and generally orders of magnitude faster. However, cache memory costs significantly more per byte than storage devices, and therefore cache memory size is correspondingly small in order to be cost effective. The need is always present for cache memories to operate as efficiently as possible in order for overall storage controller performance to be maximized to all interconnected host computers.

Host computers interact with data storage systems by providing either random or sequential I/O requests. In the case of sequential I/O requests, it is desirable for storage controllers to handle as many different sequential I/O streams as possible in order to maximize performance. Sequential I/O streams include a series of generally consecutive I/O requests directed to the same storage device, logical volume, or VDisk. While some sequential I/O streams may be read requests, other sequential I/O streams may be write requests.

SUMMARY

The present invention is directed to solving disadvantages of the prior art. In accordance with embodiments of the present invention, a method for providing efficient sequential I/O processing in a storage controller is provided. In response to the storage controller receiving a host I/O request from a host computer, the method includes determining, by the storage controller, if the host I/O request corresponds to an active stream. If the host I/O request corresponds to an active stream, then the method includes updating, by the storage controller, an existing active list entry of an active list corresponding to the active stream, and if the host I/O request does not correspond to an active stream, then the method includes converting, by the storage controller, an inactive list entry of an inactive list into a new active list entry of the active list, and configuring, by the storage controller, the new active list entry. The inactive list stores available but unallocated storage controller memory resources, and the active list stores allocated storage controller memory resources. The active list includes an active list head at one end of the active list and an active list tail at an opposite end of the active list. The active list head corresponds to a most recently used active list entry, and the active list tail corresponds to a least recently used active list entry.

In accordance with another embodiment of the present invention, a storage controller for providing computer efficient sequential I/O processing is provided. The storage controller includes a processor and a memory, coupled to the processor. The memory includes an active list, where the active list stores allocated storage controller memory resources. The active list includes an active list head at one end of the active list, and the active list head corresponds to a most recently used active list entry. The active list also includes an active list tail at an opposite end of the active list, and the active list tail corresponds to a least recently used active list entry. The memory also includes an inactive list, where the inactive list stores available but unallocated memory resources. In response to the storage controller receiving a host I/O request from a host computer, the storage controller determines if the host I/O request corresponds to an active stream. If the host I/O request corresponds to an active stream, the storage controller updates an existing active list entry of the active list corresponding to the active stream. If the host I/O request does not correspond to an active stream, the storage controller converts an inactive list entry of the inactive list into a new active list entry of the active list and configures the new active list entry.

In accordance with yet another embodiment of the present invention, a system for efficiently processing sequential I/O requests is provided. The system includes a host computer, a storage controller, coupled to the host computer, and one or more storage devices, coupled to the storage controller. The storage controller includes a processor and memory, coupled to the processor. The memory includes an active list of entries, where each active list entry corresponds to allocated memory resources for different sequential I/O streams of host I/O requests. Each active list entry includes a time last hit, where the time last hit is a time stamp of the last received host I/O request directed to a sequential I/O stream. The memory also includes an inactive list of entries, where each inactive list entry corresponds to available memory resources for new sequential I/O streams. In response to the storage controller receiving a host I/O request from the host computer and determining the host I/O request does not correspond to a sequential I/O stream in the active list and there are no inactive list entries in the inactive list, the storage controller converts an existing active list entry into a new active list entry. The new active list entry corresponds to the received host I/O request.

An advantage of the present invention is it provides efficient use of storage controller memory resources for sequential I/O read and write streams. All storage controllers have a fixed amount of onboard memory resources at any given time. The present invention allocates the limited memory resources to the sequential I/O streams that can benefit the most from the resources.

Another advantage of the present invention is it utilizes a limited amount of historical data to manage ongoing sequential I/O streams. Therefore, little memory space is allocated to stream tracking metadata, which means more space is available for other uses, including storing read and write cache data.

Additional features and advantages of embodiments of the present invention will become more readily apparent from the following description, particularly when taken together with the accompanying drawings.

BRIEF DESCRIPTION OF THE DRAWINGS

FIG. 3 is a block diagram illustrating a data storage system in accordance with embodiments of the present invention.

FIG. 4 is a block diagram illustrating a host data stream in accordance with embodiments of the present invention.

FIG. 5 is a diagram illustrating a first host data stream example in accordance with embodiments of the present invention.

FIG. 6a is a diagram illustrating a second host data stream example in accordance with embodiments of the present invention.

FIG. 6b is a diagram illustrating burst parameters in accordance with embodiments of the present invention.

FIG. 7 is a diagram illustrating outstanding I/Os per burst in accordance with embodiments of the present invention.

FIG. 8 is a diagram illustrating logical volume, VDisk, and storage device metadata in accordance with embodiments of the present invention.

FIG. 9a is a block diagram illustrating active and inactive lists stored in data stream metadata memory in accordance with embodiments of the present invention.

FIG. 9b is a block diagram illustrating stream metadata stored in active list entries in accordance with embodiments of the present invention.

FIG. 10 is a flowchart illustrating an initialization process in accordance with embodiments of the present invention.

FIG. 11 is a flowchart illustrating a new I/O request update process in accordance with embodiments of the present invention.

FIG. 12 is a flowchart illustrating a command completion process in accordance with embodiments of the present invention.

FIG. 13 is a flowchart illustrating an I/O request update process in accordance with embodiments of the present invention.

FIG. 14 is a flowchart illustrating a stream association process in accordance with embodiments of the present invention.

FIG. 15a is a flowchart illustrating a single stale stream recycle process in accordance with a first embodiment of the present invention.

FIG. 15b is a flowchart illustrating a predetermined number of stale streams recycle process in accordance with a second embodiment of the present invention.

FIG. 15c is a flowchart illustrating an all stale streams recycle process in accordance with a third embodiment of the present invention.

FIG. 16 is a flowchart illustrating an active stream configuration process in accordance with embodiments of the present invention.

FIG. 17 is a flowchart illustrating a move window adjustment process in accordance with embodiments of the present invention.

DETAILED DESCRIPTION

The present invention is directed to improvements to sequential I/O resource allocation in a storage controller from host computer sequential read and write requests. Keeping in mind the desire to keep storage controller costs down by limiting the amount of onboard memory resources, it is necessary to improve sequential I/O processing efficiency and performance.

One way to improve sequential I/O performance is simply to increase the amount of storage controller memory as much as possible in order to track and provide cache memory allocation for all currently active I/O streams. However, this will usually fill the storage controller memory with either infrequently accessed or useless data that the host computer may never request or may request much later. Additionally, in systems where a storage controller is coupled to multiple host computers, filling a cache memory with large amounts of data for a specific host computer may prevent other host computers from utilizing the storage controller memory resources, severely limiting read and/or write performance to the other host computers.

Each host computer issues read and write data requests based on the applications and other programs executed by that host computer. In most cases, the applications and other programs currently being executed by one host computer is different than the applications and other programs being executed by a different host computer. Each host computer therefore issues a different set of sequential read or write requests, which are known as a host stream. A given host computer can issue multiple host streams.

While a static read cache size is generally efficient for host computers that provide a relatively constant stream of read requests, this is often not the case for host computers that issue bursts of read requests to storage controllers. A burst is a consecutive group of sequential host read requests from the same host computer. A burst of host read requests creates a high initial queue depth. If the burst of host read requests adds up to more than the static read ahead size of the read cache, the host stream will eventually catch up with read ahead and cache misses will occur with every burst, thus lowering read performance.

What is needed is a storage controller that keeps track of important statistics for all host streams, and allocates limited memory resources to the sequential I/O streams that are the most active. Inactive streams or streams that have lower or older utilization are recycled in order to provide memory resources for newer and more active streams.

Figure 1A:
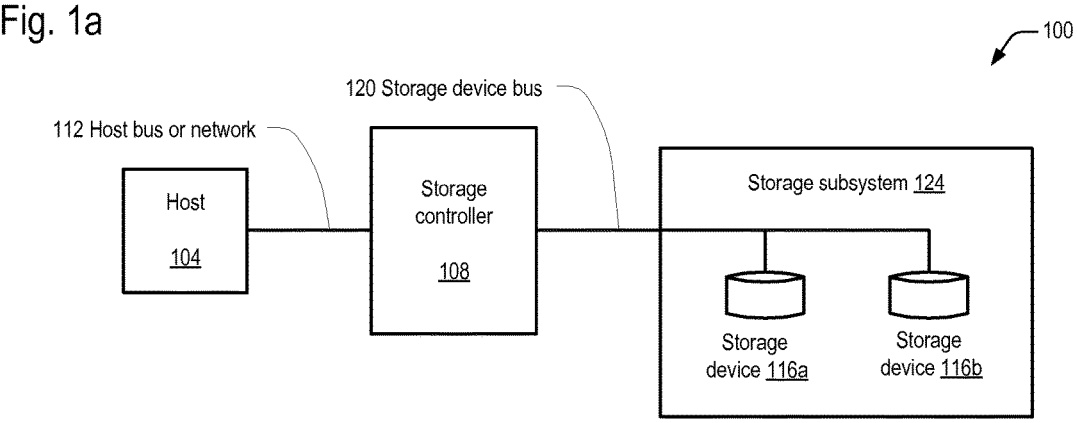
FIG. 1a is a block diagram illustrating components of a first non host-based data storage system in accordance with embodiments of the present invention.

Referring now to FIG. 1a, a block diagram illustrating components of a first non host-based data storage system 100 in accordance with embodiments of the present invention is shown.

The data storage system 100 includes one or more host computers 104. Host computer 104 is generally a server, but could also be a desktop or mobile computer. Host computer 104 executes application programs that generate read and write requests to storage controller 108 over host bus or network 112. Host bus or network 112 in one embodiment is a bus such as SCSI, FC-AL, USB, Firewire, SSA, SAS, SATA, or Infiniband. In another embodiment, host bus or network 112 is a network such as Ethernet, iSCSI, Fiber Channel, SSA, ESCON, ATM, FICON, NVMe, or Infiniband.

Host computer 104 interfaces with one or more storage controllers 108, although only a single storage controller 108 is illustrated for clarity. In one embodiment, storage controller 108 is a RAID controller. In another embodiment, storage controller 108 is a storage appliance such as a provisioning, virtualization, replication, or backup appliance. Storage controller 108 transfers data to and from storage devices 116a, 116b in storage subsystem 124, over storage device bus 120. Storage device bus 120 is any suitable storage bus or group of buses for transferring data directly between storage controller 108 and storage devices 116, including but not limited to SCSI, Fiber Channel, SAS, SATA, or SSA.

Storage subsystem 124 in one embodiment contains twelve storage devices 116. In other embodiments, storage subsystem 124 may contain fewer or more than twelve storage devices 116. Storage devices 116 include various types of storage devices, including hard disk drives, solid state drives, optical drives, and tape drives. Within a specific storage device type, there may be several sub-categories of storage devices 116, organized according to performance. For example, hard disk drives may be organized according to cache size, drive RPM (5,400, 7,200, 10,000, and 15,000, for example), queue depth, random transfer rate, or sequential transfer rate.

Figure 1B:
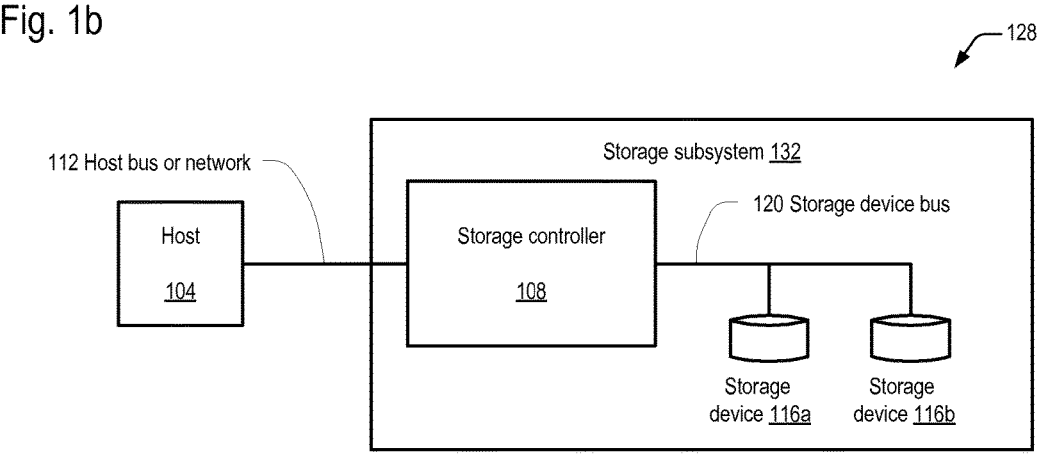
FIG. 1b is a block diagram illustrating components of a second non host-based data storage system in accordance with embodiments of the present invention.

Referring now to FIG. 1b, a block diagram illustrating components of a second non host-based data storage system 128 in accordance with embodiments of the present invention is shown. Non host-based data storage system 128 is similar to non host-based data storage system 100, with the exception being storage controller 108 is within storage subsystem 132, along with storage devices 116. In the embodiment illustrated in FIG. 1b, storage controller 108 is a single RAID controller 108. However, in other embodiments, storage controller 108 represents multiple RAID controllers 108.

Figure 1C:
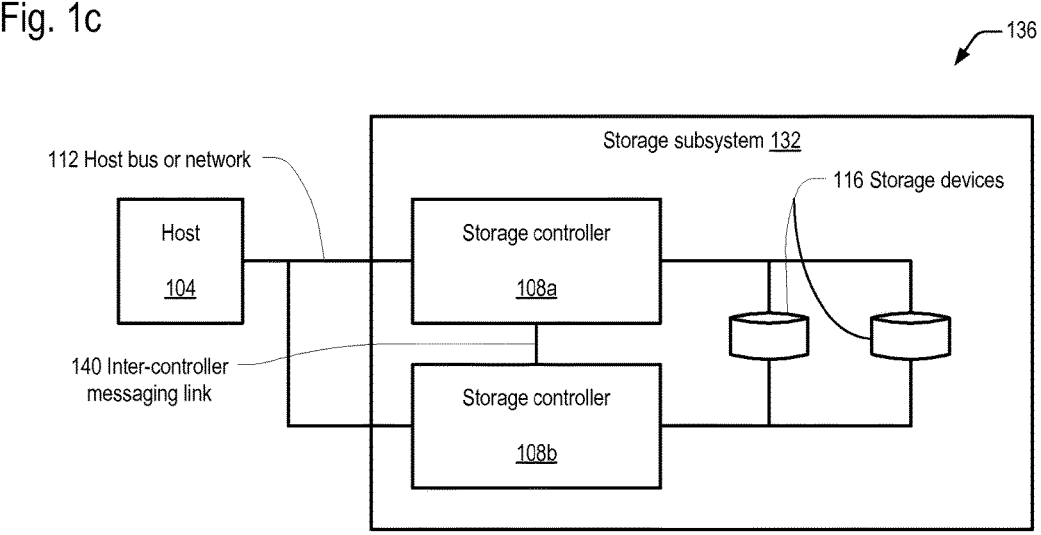
FIG. 1c is a block diagram illustrating components of a third non host-based data storage system in accordance with embodiments of the present invention.

Referring now to FIG. 1c, a block diagram illustrating components of a third host-based data storage system 136 in accordance with embodiments of the present invention is shown. Data storage system 136 is similar to data storage systems 100 and 128, except storage controller 108 represents two redundant storage controllers 108a, 108b. In one embodiment, storage controllers 108a, 108b utilize active-active failover in order to have continued availability to storage devices 116 by host 104 in the event of a failure of one of storage controllers 108a, 108b. Inter-controller messaging link 140 provides a communication and data path between storage controllers 108a, 108b in order to mirror write data and synchronize failover and failback operations.

Figure 2A:
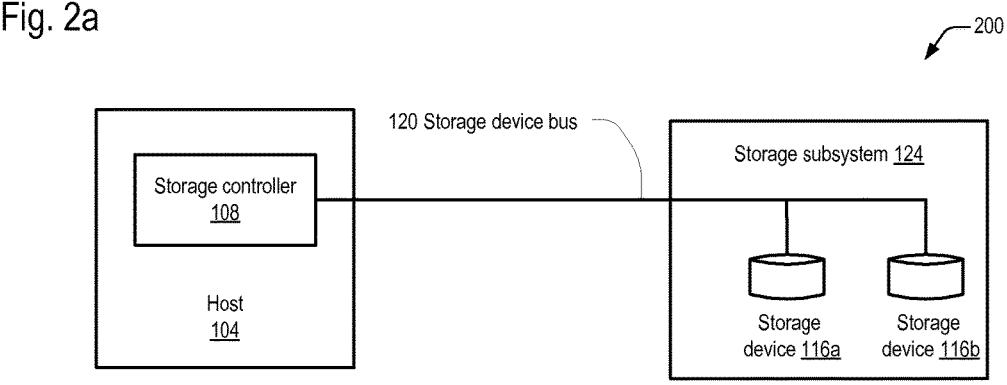
FIG. 2a is a block diagram illustrating components of a first host-based data storage system in accordance with embodiments of the present invention.

Referring now to FIG. 2a, a block diagram illustrating components of a first host-based data storage system 200 in accordance with embodiments of the present invention is shown. First host-based data storage system 200 is similar to first non host-based storage system 100 of FIG. 1a, except storage controller 108 is within host computer 104. Storage controller 108 interfaces through a local bus of host computer 104, where the local bus may be any suitable bus for high speed transfers between the CPU of host computer 104 and storage controller 108, including Rapid IO, PCI, PCI-X, or PCI Express. Storage controller 108 may either be integrated on the motherboard of host computer 104, or may be an add-in board or other form of assembly in host computer 104.

Figure 2B:
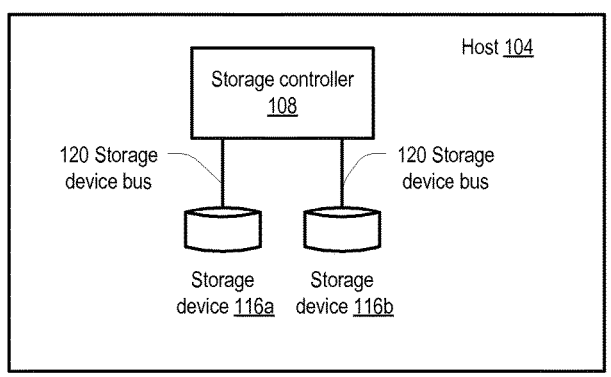
FIG. 2b is a block diagram illustrating components of a second host-based data storage system in accordance with embodiments of the present invention.

Referring now to FIG. 2b, a block diagram illustrating components of a second host-based data storage system 204 in accordance with embodiments of the present invention is shown. Second host-based data storage system 204 integrates the functions of storage subsystem 124 into host computer 104. Data storage system 204 represents a self-contained highly integrated data storage system.

Figure 2C:
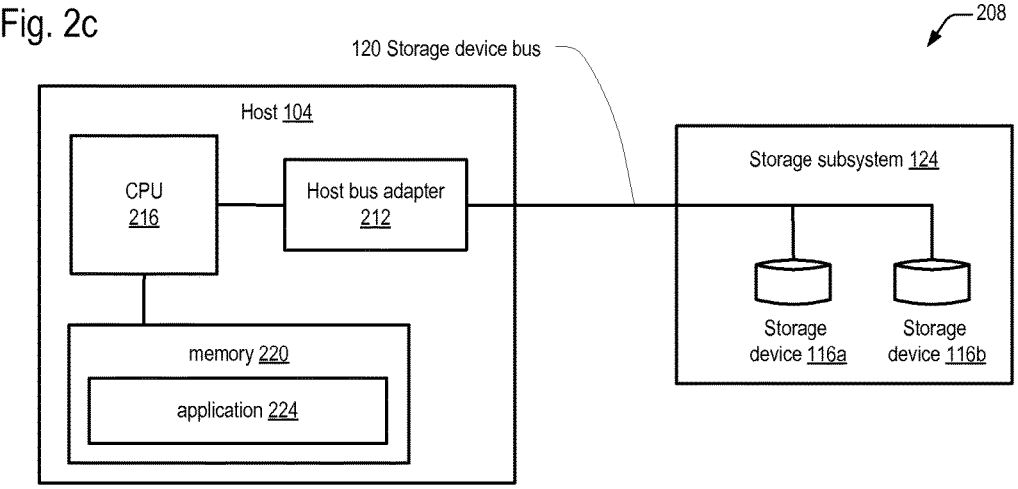
FIG. 2c is a block diagram illustrating components of a third host-based data storage system in accordance with embodiments of the present invention.

Referring now to FIG. 2c, a block diagram of illustrating components of a third host-based data storage system 208 in accordance with embodiments of the present invention is shown. Third host-based data storage system 208 is similar to first host-based data storage system 200, but instead of an integrated storage controller 108, a software-based approach is used. Interface between host computer 104 and storage device bus 120 is provided by host bus adapter 212, which provides appropriate data and command buffering functions as well as protocol control and low-level error handling. CPU 216 executes applications 224 in memory 220 to control data flow between memory 220 and storage devices 116a, 116b in storage subsystem 124.

Referring now to FIG. 3, a block diagram illustrating a data storage system 300 in accordance with embodiments of the present invention is shown. Data storage system 300 includes one or more host computers 104 interconnected to a storage controller 108 through bus or network 112. Host computer 104 generates a host stream 308, which are multiple groups of host I/O requests 332.

Storage controller 108 includes a CPU or processor 312, which executes program instructions stored in a memory 316 coupled to the CPU 312. CPU 312 includes any processing device suitable for executing storage controller 108 programs, such as Intel x86-compatible processors, embedded processors, mobile processors, and/or RISC processors. CPU 312 may include several devices including field-programmable gate arrays (FPGAs), memory controllers, North Bridge devices, and/or South Bridge devices.

Memory 316 may be one or more forms of volatile memory 316, non-volatile memory 316, or a combination of both volatile and non-volatile memories 316. The memory 316 includes firmware which includes program instructions that CPU 312 fetches and executes, including program instructions for the processes of the present invention. Examples of non-volatile memory 316 include, but are not limited to, flash memory, SD, EPROM, EEPROM, hard disks, and NOVRAM. Volatile memory 316 stores various data structures and user data. Examples of volatile memory 316 include, but are not limited to, SRAM, DDR RAM, DDR2 RAM, DDR3 RAM, Z-RAM, TTRAM, A-RAM, ETA RAM, and other forms of temporary memory.

Memory 316 includes a read data cache 324 and in some embodiments a write data cache 328, which provide improved read and write performance, respectively, to the host computer 104. Memory 316 also includes data stream metadata 320. Data stream metadata 320 stores parameters related to host I/O requests 332, and are used to control sequential I/O operations.

Storage controller 108 is coupled to storage subsystem 124, 132, which includes one or more storage devices 116a-116n. Frequently accessed data is read from storage devices 116 into read data cache 324, where it can be provided in response to host read requests 332 much faster than directly from the storage devices 116. Write data is initially stored in the write data cache 328, which is much faster than writes sent directly to storage devices 116.

In some embodiments, storage controller 108 includes timers 340. Timers 340 may be hardware timers controlled by CPU 312, or it may be software routines that execute on CPU 312. Timers 340 measures the time between bursts 616, and is discussed in the following description and figures. Timers 340 may represent any number of timers, and in the present invention there is one timer 340 allocated to each active stream 912a-j corresponding to each logical volume, VDisk, or storage device 804.

It should be understood that storage controller 108 may be functionally organized in countless different functional organizations and architectures without diverting from the scope or operation of the present invention.

Referring now to FIG. 4, a block diagram illustrating a host data stream 308 in accordance with embodiments of the present invention is shown. Host data stream 308 includes groups of consecutive host I/O requests 332, which are known as bursts or host bursts. Although host data stream 308 may include any number of bursts or host bursts, four host bursts are shown: host burst 0 404, host burst 1 412, host burst 2 420, and host burst 3 428. Each host burst 404, 412, 420, 428 may include the same or a different number of host I/O requests 332. Host burst 0 404 includes host I/O request 0 408a through host I/O request q 408q. Host burst 1 412 includes host I/O request 0 416a through host I/O request t 416t. Host burst 2 420 includes host I/O request 0 424a through host I/O request w 424w. Host burst 3 428 includes host I/O request 0 432a through host I/O request z 432z.

Each host I/O request 332, 408, 416, 424, and 432 includes an I/O length 440 and an I/O address 444. I/O length 440 is the number of blocks or bytes to be read from or written to storage devices 116, and the I/O address 444 is the starting address the host I/O request 332, 408, 416, 424, and 432 will be directed to.

Referring now to FIG. 5, a diagram illustrating a first host data stream 308a example in accordance with embodiments of the present invention is shown. Host data stream 308a includes multiple host I/O requests 332 received over time 528, where the host I/O requests 332 are individually identified as host I/O requests 504. FIG. 5 illustrates a first burst of sequential host I/O requests 504a, 504b, and 504c, a second burst of sequential host I/O requests 504g, 504h, 504i, and 504j, and a third burst of sequential host I/O requests 504n, 504o, 504p, and 504q. Storage controller 108 receives other non-sequential host I/O requests during the time that the three bursts of sequential I/O requests are received, and the non-sequential host I/O requests are identified as I/O requests 504d, 504e, 504f, 504k, 504l, and 504m.

Each host I/O request 504 has an associated I/O size 516, and for simplicity in this example, all I/O requests 504 are shown with the same I/O size 516. Additionally, each I/O request 504 is addressed to an LBA range 520, including a starting LBA Address 524 and an ending LBA address 532. The storage controller 108 receives each I/O request 504 at a specific time 528. For example, the storage controller 108 receives sequential host I/O request 0 504a at time $t_0$, sequential host I/O request 1 504b at time $t_1$, and sequential host I/O request 2 504c at time $t_2$.

The storage controller 108 determines if each received host I/O request 504 is either sequential or non-sequential, and this is described in more detail with respect to the following flowcharts and accompanying description. For sequential host I/O requests 504, the storage controller 108 establishes both a stream window 508 and move window 512, where the move window 512 represents an LBA range 520 that is smaller than the LBA range 520 used for the stream window 508, and contained within the boundaries of the stream window 508. The stream window 508 establishes the LBA limits for the current stream 308a, while the storage controller 108 uses the move window to determine when the move window 512 and stream window 508 boundaries need to change. If a sequential host I/O request 504 is within a stream window 508, but outside the move window 512 corresponding to the stream window 508, the move window 512 and stream window 508 boundaries need to change. The objective is to keep sequential I/O requests 504 for the same stream 308a within a move window 512 and stream window 508.

The storage controller 108 initially establishes the move window 512a based on LBAs of sequential I/O requests 504a, 504b, and 504c. I/O requests 504d, 504e, and 504f are clearly outside both move window 512a and stream window 508a, which indicates to storage controller 108 that the move window 512 and stream window 508 need to change. The storage controller 108 next establishes that I/O requests 504g, 504h, 504i, and 504j are sequential I/O requests 504, and changes the move window 512 to have the boundaries of move window 512b and the stream window 508 to have the boundaries of stream window 508b. I/O requests 504k, 504l, and 504m are clearly outside both move window 512b and stream window 508b, which indicates to storage controller 108 that the move window 512 and stream window 508 need to change. The storage controller 108 next establishes that I/O requests 504n, 504o, 504p, and 504q are sequential I/O requests 504, and changes the move window 512 to have the boundaries of move window 512c and the stream window 508 to have the boundaries of stream window 508c. The processes that track move window 512 and stream window 508 boundaries are central to the present invention, and are described in detail with respect to FIGS. 10-17.

Referring now to FIG. 6a, a diagram illustrating a second host data stream 308b example in accordance with embodiments of the present invention is shown. A group of 6 bursts 616 are shown received over time 612 by a storage controller 108, with burst size 608 in Megabytes (MB) shown for each burst 616. The example illustrated in FIG. 6a depicts 6 bursts of sequential host I/O requests 332, identified as burst 0 616a, burst 1 616b, burst 2 616c, burst 3 616d, burst 4 616e, and burst 5 616f.

The time between bursts $t_{1b}$ is shown between every two consecutive bursts 616. The time between burst 0 616a and burst 1 616b is $t_{1b0}$. The time between burst 1 616b and burst 2 616c is $t_{1b1}$. The time between burst 2 616c and burst 3

616d is $t_{1b2}$. The time between burst 3 616c and burst 4 616d is $t_{1b3}$. Finally, the time between burst 4 616d and burst 5 616e is $t_{1b4}$.

Referring now to FIG. 6b, a diagram illustrating burst parameters in accordance with embodiments of the present invention is shown. FIG. 6b references the example of FIG. 6a to illustrate burst parameters stored in metadata memory 320.

Each burst 616 has an associated burst length 620 parameter, with burst 0 616a having a burst length 620 of 2 MB, burst 1 616b having a burst length 620 of 1 MB, burst 2 616c having a burst length 620 of 6 MB, burst 3 616d having a burst length 620 of 2 MB, burst 4 616e having a burst length 620 of 1 MB, and burst 5 616f having a burst length 620 of 2 MB. Between each burst 616 is a time since last burst $t_{1b}$ 624. $T_{1b0}$ is 200 ms, $T_{1b1}$ is 30 ms, $T_{1b2}$ is 60 ms, $T_{1b3}$ is 120 ms, and $T_{1b4}$ is 200 ms.

Referring now to FIG. 7, a diagram illustrating outstanding I/Os per burst 616 in accordance with embodiments of the present invention is shown. FIG. 7 illustrates the practical interaction of various parameters over time of the present invention for a burst 616 of host I/O requests 332. For simplification purposes, it is assumed that the I/O length 440 for all host I/O requests 332 is '1' (a block, for example).

Prior to a first host I/O request 332 for the burst 616, the outstanding I/Os 704 is zero. When the storage controller 108 receives a first host I/O request 332 for the burst 616, the outstanding I/Os 704 becomes '1'—reflecting the size of the first host I/O request 332, and either the timer 340 is stopped 712 in a first embodiment, or else a stop time stamp 720 is stored in a second embodiment.

The storage controller 108 adjusts the outstanding I/Os 704 as more host I/O requests 332 are received. However, when command completions 708 occur, the storage controller 108 decreases the outstanding I/Os 704 by the size of each completed host I/O request 708. Once the outstanding I/Os 704 returns to zero (indicating the end of the current burst 616), the storage controller 108 either starts the timer 716 in the first embodiment, or else stores the start time stamp 724 in metadata memory 320 in the second embodiment. This sequence of operations is then repeated for each subsequent burst 616.

Referring now to FIG. 8, a diagram illustrating logical volume, VDisk, and storage device metadata 808 in accordance with embodiments of the present invention is shown. Sequential host I/O requests 332, 504 may be directed to either logical volumes, VDisks, or storage devices 116, and storage controller 108 has one or more logical volumes, VDisks, or storage devices 116. FIG. 8 illustrates a system where a storage controller 108 has five logical volumes, VDisks, or storage devices 116, identified as 804a through 804e.

Each logical volume, VDisk, or storage device 804 has corresponding logical volume, VDisk, or storage device metadata set 808a, and each metadata set 808 is managed independently from the other metadata sets 808. In the preferred embodiment, the storage controller 108 tracks approximately 1,000 logical volumes, VDisks, or storage devices 804, 65 sequential I/O streams 308 for the first 32 logical volumes, VDisks, or storage devices 804, and 4 sequential I/O streams 308 for the any logical volumes, VDisks, or storage devices 804 beyond the first 32 logical volumes, VDisks, or storage devices 804.

In an alternative embodiment, there is a common pool of active streams 908 available to all logical volumes, VDisks, or storage devices 804, instead of an active stream list 908 allocated to each logical volume, VDisk, or storage device 804. This has the advantage of additional flexibility in assigning or limiting streams to each logical volume, VDisk, or storage device 804, at the penalty of additional management complexity.

Referring now to FIG. 9a, a block diagram illustrating active 908 and inactive lists 904 stored in data stream metadata memory 320 in accordance with embodiments of the present invention is shown. The metadata memory 320 stores parameters used in the process of the present invention.

Each logical volume, VDisk, or storage device 804 has a corresponding active 908 and inactive 904 list. There are a predetermined number of stream resources 904a-z available for each logical volume, VDisk, or storage device 804, and each stream resource 904a-z stores metadata parameters for a single sequential host I/O stream 308. Initially, all stream resources 904a-z are on the inactive list 904. Later, as individual streams 308 are tracked, the stream resources 904a-z become active streams 912a-z. In all cases, the number of stream resources 904a-z plus the number of active streams 912a-z is always equal to the predetermined number. In the preferred embodiment, the predetermined number of stream resources 904a-z plus active streams 912a-z is equal to 65. This number is determined by the size of memory 316 on the storage controller 108, the size of data structures 808, and the number of sequential host I/O streams 308 it is productive to concurrently track.

The inactive list 904 contains available resources that can be assigned to new streams 308. As a stream resource 904a-z is assigned to an active stream 912a-z, the inactive list is reduced by one stream resource 904a-z. At some point, all stream resources 904a-z may be assigned to active streams 912a-z. In that case, there are no more stream resources 904a-z on the inactive list 904, and the storage controller 108 must free up at least one active stream 912a-z on the active list 908 in order to assign a stream resource 904a-z to a new stream 308. All stream resources 904a-z on the inactive list 904 are equal in all respects, and any stream resource 904a-z may be selected for a new stream 308.

The active list 908 contains active streams 908a-z for streams 308 directed to the current logical volume, VDisk, or storage device 804. At power-on, all active lists 908 are empty, and contain no active streams 912a-z. As stream resources 904a-z are assigned to active streams 912a-z, the active list 908 is populated. At some point, all stream resources 904a-z may be assigned to the active list 908, and the active list 908 will contain the predetermined number of active streams 912a-z. Active streams 912a-z are ordered within the active list 908, with the most recently used active stream placed at the head of the active list 916. Therefore, the least recently used active stream is placed at the tail of the active list 920, opposite to the head of the active list 916.

Each active stream entry 912a-z includes a number of metadata parameters used by the storage controller 108 to track each active stream 912. A stream last hit ($t_{1h}$) 924 value stores the time the corresponding stream was last accessed. The current stream window 508 has boundaries designated by a stream window upper LBA limit 928 and a stream window lower LBA limit 932. The current move window 512 has boundaries designated by a move window upper LBA limit 936 and a move window lower LBA limit 940. Each stream 308 also has a stream recycle time 944, which is used to calculate when an active stream 912 needs to be recycled to the inactive list 904 to generate a newly available stream resource 904a-z. Each stream 308 has a count of stream outstanding I/Os 960, which the storage controller 108 uses in order to determine when streams 308 start and stop. The stream outstanding I/Os 960 stores the count identified by outstanding I/Os in FIG. 7.

The storage controller 108 keeps track of burst start time 964a and burst stop time 964b in order to calculate time since last burst ($t_{1b}$) entries for a time since last burst ($t_{1b}$) queue 948. The burst start time 964a is stored when the stream outstanding I/Os 960 transitions from 1 to 0. The burst stop time 964b is stored when the stream outstanding I/Os 960 transitions from 0 to 1.

The time since last burst queue 948 is a circular queue of a specified number of time since last burst entries 948a-j. In the preferred embodiment, there are 10 time since last burst entries a-j on the time since last burst queue 948. In other embodiments, there may be less than or more than 10 entries. The current entry in the time since last burst queue 948 is identified by a current time since last burst pointer 952, which increments unidirectionally 956 as directed by the process of the present invention.

The storage controller 108 measures the time since last burst $t_{1b}$ one of two ways. In one embodiment, the storage controller includes a timer 340. The storage controller 108 starts the timer 340 when a burst 616 ends, and stops the timer 340 when the next burst 616 starts. The timer 340 value is stored as the time since last burst $t_{1b}$ 948a-j at the location in metadata memory 320 identified by the current time since last burst pointer 952. In another embodiment, the metadata memory 320 includes a $t_{1b}$ burst start time 964a and a $t_{1b}$ burst stop time stamp 964b. The $t_{1b}$ burst start time 964a is a free-running timer 340 value that is stored when a burst 616 ends. The $t_{1b}$ burst stop time 964b is a free-running timer 340 value that is stored when the next burst 616 starts. The difference between the $t_{1b}$ burst start time 964a and the $t_{1b}$ burst stop time 964b is stored as the time since last burst $t_{1b}$ entry 948a-j at the location in metadata memory 320 identified by the current time since last burst pointer 952.

Although a circular queue is illustrated for the time since last burst queue 948, it should be understood by one of ordinary skill in the art that any number of data structures can be utilized for storing a plurality of burst lengths 948a-j, including multiple data structures.

Referring now to FIG. 10, a flowchart illustrating an initialization process in accordance with embodiments of the present invention is shown. Flow begins at block 1004.

At block 1004, the storage controller 108 populates all inactive lists 904 with a predetermined number of stream resources 904a-j. In the preferred embodiment, the predetermined number of stream resources 904a-j is 65. In other embodiments, the predetermined number of stream resources 904a-j is either more than or less than 65. Flow proceeds to block 1008.

At block 1008, the storage controller 108 sets all window LBA limits 928, 932, 936, and 940 and time last hit values 924 to zero. This is performed for each logical volume, VDISK, or storage device 804 to initialize the logical volume, VDISK, or storage device metadata 808 in preparation for tracking sequential I/O streams 308. Flow proceeds to block 1012.

At block 1012, the storage controller 108 sets the stream recycle time 944 in each logical volume, VDISK, or storage device metadata 808 to a default value. This sets a default value to determine when active streams 912 should be recycled, if necessary. In the preferred embodiment, the default value for the stream recycle time is 6 seconds. In other embodiments, the default value for the stream recycle time 944 is less than or more than 6 seconds. Flow ends at block 1012.

Referring now to FIG. 11, a flowchart illustrating a new I/O request update process in accordance with embodiments of the present invention is shown. The new I/O update process keeps track of incoming host I/O requests 332 and adjusts stream recycle time 944 for each active stream 912a-j based on outstanding I/Os 704. Flow begins at block 1104.

At block 1104, the storage controller 108 receives a host I/O request 332 from a host computer 104. Flow proceeds to block 1108.

At block 1108, the storage controller 108 increments the outstanding I/O count 960 for the active stream 912a-j corresponding to the received host I/O request 332. The outstanding I/O count 960 is the current count of I/O requests 332 issued to a logical volume, VDisk, or storage device 804 that have not yet completed. Flow proceeds to decision block 1112.

At decision block 1112, the storage controller 108 determines if the outstanding I/O count 960 is equal to one. If the outstanding I/O count 960 is equal to one, then a new burst 616 has started in the current active stream 912a-j (i.e. the outstanding I/O count 960 was equal to zero before receiving the host I/O request 332 in block 1104). If the outstanding I/O count 960 is equal to one, then flow proceeds to block 1116. If the outstanding I/O count 960 is not equal to one, then a new burst 616 has not started and flow ends. For the purposes of the present invention, it is only important to know when a burst 616 begins and ends, and maintain the time since last burst 948 metadata.

At block 1116, the storage controller 108 stops a burst timer 340 for the active stream 912a-j corresponding to the received host I/O request 332. A new burst 616 has started since the outstanding I/O count 960 transitioned from zero to one; therefore, the time since last burst 948 needs to be recorded. Flow proceeds to block 1120.

At block 1120, the storage controller 108 stores the burst timer 340 value as $t_{1b}$ burst stop time 964b, calculates a time since last burst value 948 as the difference between the burst stop time 964b and the burst start time 964a, and stores the time since last burst value in the time since last burst queue 948 location corresponding to the current time since last burst pointer 952. Flow proceeds to block 1124.

At block 1124, the storage controller 108 increments the current time since last burst pointer 952, and initializes the burst timer 340. In embodiments where the burst timer is free running, it is not required to initialize the burst timer 340. However, these embodiments require storing a burst start time value 964a. This prepares the next time since last burst queue location 948 to store a next time since last burst value 948a-j, and prepares the burst timer 340 to begin counting when the current burst 616 ends. Flow proceeds to decision block 1128.

At decision block 1128, the storage controller 108 determines if the time since last burst queue 948 is full. The time since last burst queue 948 is full if every location in the queue 948a-j contains a burst timer 340 value. If the time since last burst queue 948 is full, then flow proceeds to block 1132. If the time since last burst queue 948 is not full, then flow ends. New stream recycle times 944 are only calculated if the time since last burst queue 948 is full. Before the time since last burst queue 948 is full, a default value is used for the stream recycle time 944. In the preferred embodiment, the default value for the stream recycle time 944 is 6 seconds. In other embodiments, the default value for the stream recycle time 944 is less than or more than 6 seconds.

At block 1132, the storage controller 108 calculates a weighted average of the time since last burst queue 948 to create a stream recycle time 944. A weighted average is preferable in order to give more recent time since last burst values 948a-j greater weight than older time since last burst values 948a-j. In the preferred embodiment, there are ten time since last burst values 948a-j in each time since last burst queue 948. Also in the preferred embodiment, the weighted average is equal to the sum of each weighted time since last burst values 948a-j divided by ten factorial. The storage controller 108 calculates the weighted time since last burst values 948a-j by multiplying the most recent $t_{1b}$ value by 10, the next most recent $t_{1b}$ value by 9, and so forth, until the least recent $t_{1b}$ value is multiplies by 1. The most recent $t_{1b}$ value is identified by the current position of the time since last burst pointer 952. In other embodiments, the weighted average is calculated differently, or the stream recycle time 944 is a simple non-weighted average of the values in the time since last burst queue 948. Flow proceeds to block 1136.

At block 1136, the storage controller 108 stores the calculated stream recycle time from block 1132 in the stream recycle time 944 location corresponding to the received host I/O request 332. Flow ends at block 1136.

Referring now to FIG. 12, a flowchart illustrating a command completion process in accordance with embodiments of the present invention is shown. Flow begins at block 1204.

At block 1204, a host I/O request 332 completes. The host I/O request 332 was directed to a specific logical volume, VDisk, or storage device 804. Flow proceeds to block 1208.

At block 1208, the storage controller 108 decrements the outstanding I/O count 960 for the active stream 912a-j corresponding to the completed host I/O request 332. There is now one less outstanding I/O 704 to the logical volume, VDisk, or storage device 804 the completed host I/O request 332 was directed to. Flow proceeds to decision block 1212.

At decision block 1212, the storage controller 108 determines if the outstanding I/O count 960 is equal to zero. If the outstanding I/O count 960 is equal to zero, then the current burst 616 has ended and flow proceeds to block 1216. If the outstanding I/O count 960 is not equal to zero, then the current burst 616 has not ended and flow ends at decision block 1212.

At block 1216, the storage controller 108 initializes and starts a burst timer 340 for the active stream 912a-j corresponding to the completed host I/O request 332. Flow proceeds to block 1220.

At block 1220, the storage controller 108 stores the burst timer value 340 as the burst start time 964a for the active stream 912a-j corresponding to the completed host I/O request 332. Flow ends at block 1220.

Referring now to FIG. 13, a flowchart illustrating an I/O request 332 update process in accordance with embodiments of the present invention is shown. Flow begins at block 1304.

At block 1304, the storage controller 108 receives a host I/O request 332 from a host computer 104. Flow proceeds to block 1308.

At block 1308, the storage controller 108 searches the active list 908 corresponding to the logical volume, VDisk, or storage device 804 that the host I/O request 332 is directed to. Flow proceeds to decision block 1312.

At decision block 1312, the storage controller 108 determines if the starting LBA 524 of the received host I/O request 332 is within an active stream window 508. The process for searching the active list 908 and comparing the starting LBA 524 to the stream window 508 limits is described in more detail with reference to FIG. 14. If the starting LBA 524 of the received host I/O request 332 is within an active stream window 508, then flow proceeds to block 1336. If the starting LBA 524 of the received host I/O request 332 is not within an active stream window 508, then flow proceeds to decision block 1316.

At decision block 1316, the storage controller 108 determines if the inactive list 904 corresponding to the logical volume, VDisk, or storage device 804 that the host I/O request 332 is directed to is empty. The host I/O request 332 is not within an active stream window 908; therefore, a new active stream 908a-j needs to be created. If the inactive list 904 corresponding to the logical volume, VDisk, or storage device 804 that the host I/O request 332 is directed to is empty, then flow proceeds to block 1320. If the inactive list 904 corresponding to the logical volume, VDisk, or storage device 804 that the host I/O request 332 is directed to is not empty, then flow proceeds to block 1328.

At block 1320, the storage controller 108 recycles stale streams. No stream resources 904a-j are available in the inactive list 904, and the storage controller 108 needs to recycle one or more active streams 912a-j from the active list 908. The active stream recycle process is described in more detail in FIGS. 15a, 15b, and 15c. Embodiments that recycle only a single active stream 912a-j at a time use the process of FIG. 15a. Embodiments that recycle up to a predetermined number of active streams 912a-j at a time use the process of FIG. 15b. Embodiments that recycle all active streams 912a-j that meet the recycle criteria use the process of FIG. 15c. Flow proceeds to decision block 1324.

At decision block 1324, the storage controller 108 once again determines if the inactive list 904 corresponding to the logical volume, VDisk, or storage device 804 that the host I/O request 332 is directed to is empty. It is possible that none of the stale stream recycle processes of FIGS. 15a-15c will identify any stale streams 308 that can be recycled. If that is the case, then flow ends at decision block 1324. However, if the processes of FIGS. 15a-15c identified at least one stale stream 308 that can be recycled and placed the stream(s) 308 on the inactive list 904, then flow proceeds to block 1328.

At block 1328, the storage controller 108 removes a stream resource 904a-j from the inactive list 904. There is now one less stream resource 904a-j on the inactive list 904 than before, and if there was only one stream resource 904a-j on the inactive list 904 prior to this step, there are now zero stream resources 904a-j on the inactive list 904. Flow proceeds to block 1332.

At block 1332, the storage controller 108 configures a new active stream 912a-j, using the recently recovered stream resource 904a-j from the inactive list 904. The new active stream 912a-j configuration process is described in more detail with respect to FIG. 16. Flow proceeds to block 1340.

At block 1336, the storage controller 108 removes an active stream 912a-j from the active list 908. The starting LBA 524 of the received host I/O request 332 is within an active stream window 508, and the storage controller removes the active stream 912a-j corresponding to the received host I/O request 332 from the active list 908. Flow proceeds to block 1340.

At block 1340, the storage controller 108 updates the time last hit 924 for the removed active stream 912a-j to reflect the current time. Flow proceeds to block 1344.

At block 1344, the storage controller 108 adjusts the move window 512 for the removed active stream 912a-j, if necessary. If the starting LBA 524 of the received host I/O request 332 is outside the current move window 512, the storage controller 108 adjusts the move window limits 936, 940. This process is described in more detail with respect to FIG. 17. Flow proceeds to block 1348.

At block 1348, the storage controller 108 places the adjusted active stream 912a-j to the head of the active list 916. This step maintains the active list 908 ordering with the most recently used active streams at the head of the active list 916, and the least recently used active streams 912 at the tail of the active list 920. At this point, the active 908 and inactive 904 lists have been adjusted to account for the received host I/O request 332, and therefore flow ends at block 1348.

Referring now to FIG. 14, a flowchart illustrating a stream association process in accordance with embodiments of the present invention is shown. The stream association process identifies an active stream 912a-j, if present, in the active list 908 corresponding to the logical volume, VDisk, or storage device 804 that the received host I/O request 332 is directed to. Flow begins at block 1404.

At block 1404, the storage controller 108 determines if the active list 908 is empty. It is possible that no active streams 912a-j are currently in the active list 908, such as following power-on initialization. If the active list 908 is empty, the flow proceeds to block 1412. If the active list 908 is not empty, then flow proceeds to block 1408.

At block 1408, the storage controller 108 selects a first active list entry 912a from the head of the active list 916. There is at least one active stream 912a-j in the active list 908, and the most recent entry 916 is selected. Flow proceeds to decision block 1416.

At decision block 1416, the storage controller 108 determines if the starting LBA 524 of the received host I/O request 332 is less than the stream window upper LBA limit 928. If the starting LBA 524 of the received host I/O request 332 is less than the stream window upper LBA limit 928, then flow proceeds to decision block 1420. If the starting LBA 524 of the received host I/O request 332 is not less than the stream window upper LBA limit 928, then the received host I/O request 332 is not within the stream window 508 and flow proceeds to decision block 1428.

At decision block 1420, the storage controller 108 determines if the starting LBA 524 of the received host I/O request 332 is more than the stream window lower LBA limit 932. If the starting LBA 524 of the received host I/O request 332 is more than the stream window lower LBA limit 932, then flow proceeds to block 1424. If the starting LBA 524 of the received host I/O request 332 is not more than the stream window lower LBA limit 932, then the received host I/O request 332 is not within the stream window 508 and flow proceeds to decision block 1428.

At block 1424, the storage controller 108 has determined that the received host I/O request 332 is within the selected active stream window 508. Flow ends at block 1424, returning processing to decision block 1312 of FIG. 13, and transitioning to block 1336.

At decision block 1428, the storage controller 108 determines if there are more active list entries 912a-j to search. If there are more active list entries 912a-j to search, then flow proceeds to block 1436. If there are not more active list entries 912a-j to search, then flow proceeds to block 1432.

At block 1432, the storage controller 108 has determined that the received host I/O request 332 does not correspond to any active streams 912a-j in the active list 908. Flow ends at block 1432, returning processing to decision block 1312 of FIG. 13, and transitioning to decision block 1316.

At block 1436, the storage controller 108 selects a next active list entry 912a-j. Since the storage controller 108 selected the initial active list entry 912a-j from the head of the active list 916, the next active list entry 912a-j will be the next most recent active list entry 912a-j. Flow proceeds to decision block 1416 to test the stream window upper and lower LBA limits 928, 932.

The method of finding a matching active stream 912 can be improved in order to reduce the time required to search to the end of the active list 908. Alternate embodiments using data structures including interval trees or skip lists allow an LBA-based lookup and improve performance by rapidly matching up a host I/O request 332 with an active stream 912.

Referring now to FIG. 15a, a flowchart illustrating a single stale stream recycle process in accordance with a first embodiment of the present invention is shown. The embodiment illustrated in FIG. 15a recycles only a single active stream 912a-j at a time from the active list 908. Flow begins at block 1504.

At block 1504, the storage controller 108 checks the active list 908 for a first stale active stream 912a j, beginning with the tail of the active list 920. The tail of the active list 920 contains the least recently used active list entry 912a j. Flow proceeds to decision block 1508.

At decision block 1508, the storage controller 108 determines if the difference between the current time and the last time hit 924 is less than the stream recycle time 944, for the selected active stream 912a-j. The storage controller 108 calculates the stream recycle time 944 as described with reference to FIG. 11. If the difference between the current time and the last time hit 924 is less than the stream recycle time 944, then flow proceeds to block 1512. If the difference between the current time and the last time hit 924 is not less than the stream recycle time 944, then flow proceeds to decision block 1528.

At block 1512, the storage controller 108 removes the selected active stream 912a-j from the active list 908. The selected active stream 912a-j meets the stream recycle criteria of decision block 1508. Flow proceeds to block 1516.

At block 1516, the storage controller 108 sets the time last hit 924 for the selected active stream 912a-j to zero. This begins initialization of the active stream 912a j, in preparation for returning the active stream 912a-j to a stream resource 904a-j. Flow proceeds to block 1520.

At block 1520, the storage controller 108 sets all window LBA limits 928, 932, 936, and 940 for the selected active stream 912a-j to zero. This completes initialization of the active stream 912a j, in preparation for returning the active stream 912a-j to a stream resource 904a-j. Flow proceeds to block 1524.

At block 1524, the storage controller 108 places the selected and now initialized active stream 912a-j on the inactive list 904 as a stream resource 904a-j. A single active stream 912a-j has been recycled, and flow ends at block 1524. Flow proceeds to decision block 1324 of FIG. 13.

At decision block 1528, a candidate active stream 912a-j has not yet been identified for recycling to the inactive list 904, and the storage controller 108 determines if there are more active streams 912a-j in the active list 908. If there are more active streams 912a-j in the active list 908, then flow proceeds to decision block 1532. If there are not more active streams 912a-j in the active list 908, then no active streams 912a-j can be recycled, and flow ends at block 1528. Flow proceeds to decision block 1324 of FIG. 13.

At decision block 1532, the storage controller 108 determines if a next most recent active stream 912a-j in the active list 908 is available. If a next most recent active stream 912*a-j* in the active list 908 is available, then flow proceeds to block 1536. If a next most recent active stream 912*a-j* in the active list 908 is not available, then flow ends at block 1532 and no active streams 912*a-j* in the active list 908 met the recycle criteria. Flow proceeds to decision block 1324 of FIG. 13.

At block 1536, the storage controller 108 selects a next most recent active stream 912*a-j* up from the tail of the active list 920. Flow proceeds to decision block 1508 to check if the selected active stream 912*a-j* meets the recycle criteria.

Referring now to FIG. 15*b*, a flowchart illustrating a predetermined number of stale streams recycle process in accordance with a second embodiment of the present invention is shown. The embodiment illustrated in FIG. 15*b* recycles up to a predetermined number of active streams 912*a-j* at a time from the active list 908. Flow begins at block 1540.

At block 1540, the storage controller 108 checks the active list 908 for a predetermined number of stale active streams 912*a* j, beginning with the tail of the active list 920. The tail of the active list 920 contains the least recently used active list entry 912*a-j*. Flow proceeds to decision block 1544.

At decision block 1544, the storage controller 108 determines if the difference between the current time and the last time hit 924 is less than the stream recycle time 944, for the selected active stream 912*a-j*. The storage controller 108 calculates the stream recycle time 944 as described with reference to FIG. 11. If the difference between the current time and the last time hit 924 is less than the stream recycle time 944, then flow proceeds to block 1548. If the difference between the current time and the last time hit 924 is not less than the stream recycle time 944, then flow proceeds to decision block 1568.

At block 1548, the storage controller 108 removes the selected active stream 912*a-j* from the active list 908. The selected active stream 912*a-j* meets the stream recycle criteria of decision block 1544. Flow proceeds to block 1552.

At block 1552, the storage controller 108 sets the time last hit 924 for the selected active stream 912*a-j* to zero. This begins initialization of the active stream 912*a-j*, in preparation for returning the active stream 912*a-j* to a stream resource 904*a-j*. Flow proceeds to block 1556.

At block 1556, the storage controller 108 sets all window LBA limits 928, 932, 936, and 940 for the selected active stream 912*a-j* to zero. This completes initialization of the active stream 912*a* j, in preparation for returning the active stream 912*a-j* to a stream resource 904*a-j*. Flow proceeds to block 1560.

At block 1560, the storage controller 108 places the selected and now initialized active stream 912*a-j* on the inactive list 904 as a stream resource 904*a-j*. A single active stream 912*a-j* has been recycled, and flow proceeds to decision block 1564.

At decision block 1564, the storage controller 108 determines if the predetermined number of active streams 912*a-j* have been recycled. If the predetermined number of active streams 912*a-j* have been recycled, then flow ends. Flow then proceeds to decision block 1324 of FIG. 13. If the predetermined number of active streams 912*a-j* have not been recycled, then flow proceeds to decision block 1570.

At decision block 1568, the storage controller 108 determines if there are more active streams 912*a-j* in the active list 908. If there are more active streams 912*a-j* in the active list 908, then flow proceeds to decision block 1570. If there are not more active streams 912*a-j* in the active list 908, then no active streams 912*a-j* can be recycled, and flow ends at block 1568. Flow then proceeds to decision block 1324 of FIG. 13.

At decision block 1570, the storage controller 108 determines if a next most recent active stream 912*a-j* in the active list 908 is available. If a next most recent active stream 912*a-j* in the active list 908 is available, then flow proceeds to block 1572. If a next most recent active stream 912*a-j* in the active list 908 is not available, then flow ends at block 1570. Flow then proceeds to decision block 1324 of FIG. 13.

At block 1572, the storage controller 108 selects a next most recent active stream 912*a-j* up from the tail of the active list 920. Flow proceeds to decision block 1544 to check if the selected active stream 912*a-j* meets the recycle criteria.

Referring now to FIG. 15*c*, a flowchart illustrating an all stale streams recycle process in accordance with a third embodiment of the present invention is shown. The embodiment illustrated in FIG. 15*c* recycles as many active streams 912*a-j* as possible from the active list 908. Flow begins at block 1574.

At block 1574, the storage controller 108 checks for all stale active streams 912*a-j* in the active list 908, beginning with the tail of the active list 920. The tail of the active list 920 contains the least recently used active list entry 912*a-j*. Flow proceeds to decision block 1576.

At decision block 1576, the storage controller 108 determines if the difference between the current time and the last time hit 924 is less than the stream recycle time 944, for the selected active stream 912*a-j*. The storage controller 108 calculates the stream recycle time 944 as described with reference to FIG. 11. If the difference between the current time and the last time hit 924 is less than the stream recycle time 944, then flow proceeds to block 1578. If the difference between the current time and the last time hit 924 is not less than the stream recycle time 944, then flow proceeds to decision block 1588.

At block 1578, the storage controller 108 removes the selected active stream 912*a-j* from the active list 908. The selected active stream 912*a-j* meets the stream recycle criteria of decision block 1576. Flow proceeds to block 1580.

At block 1580, the storage controller 108 sets the time last hit 924 for the selected active stream 912*a-j* to zero. This begins initialization of the active stream 912*a* j, in preparation for returning the active stream 912*a-j* to a stream resource 904*a-j*. Flow proceeds to block 1582.

At block 1582, the storage controller 108 sets all window LBA limits 928, 932, 936, and 940 for the selected active stream 912*a-j* to zero. This completes initialization of the active stream 912*a-j*, in preparation for returning the active stream 912*a-j* to a stream resource 904*a-j*. Flow proceeds to block 1584.

At block 1584, the storage controller 108 places the selected and now initialized active stream 912*a-j* on the inactive list 904 as a stream resource 904*a-j*. The selected active stream 912*a-j* has been recycled, and flow proceeds to decision block 1586.

At decision block 1586, the storage controller 108 determines if there are more active streams 912*a-j* to search. If there are more active streams 912*a-j* to search, then flow proceeds to block 1590. If there are no more active streams 912*a-j* to search, then flow ends. Flow then proceeds to decision block 1324 of FIG. 13.

At decision block 1588, the storage controller 108 determines if there are more active streams 912*a-j* in the active list 908. If there are more active streams 912a-j in the active list 908, then flow proceeds to block 1590. If there are not more active streams 912a-j in the active list 908, then no active streams 912a-j can be recycled, and flow ends at block 1588. Flow then proceeds to decision block 1324 of FIG. 13.

At block 1590, the storage controller 108 selects a next most recent active stream 912a-j up from the tail of the active list 920. Flow proceeds to decision block 1576 to check if the selected active stream 912a-j meets the recycle criteria.

Referring now to FIG. 16, a flowchart illustrating an active stream configuration process in accordance with embodiments of the present invention is shown. The embodiment illustrated in FIG. 16 configures up an active stream 912a-j from a stream resource 904a-j from the inactive list. Flow begins at block 1604.

At block 1604, the storage controller 108 multiplies the host I/O request size by 8 to create a stream window offset. Flow proceeds to block 1608.

At block 1608, the storage controller 108 adds the stream window offset from block 1604 to the host I/O request starting LBA address 524, and stores the resulting stream window upper LBA limit 928 into stream metadata 912. Flow proceeds to block 1612.

At block 1612, the storage controller 108 subtracts the stream window offset from block 1404 from the received host I/O request starting LBA address 524 to create a temporary stream window lower LBA limit. Flow proceeds to decision block 1616.

At decision block 1616, the storage controller 108 determines if the temporary stream window lower LBA limit is less than 0. If the temporary stream window lower LBA limit is less than 0, then flow proceeds to block 1624. If the temporary stream window lower LBA limit is not less than 0, then flow proceeds to block 1620.

At block 1620, the storage controller 108 stores the temporary stream window lower LBA limit from block 1412 into the stream window lower LBA limit 932. Flow ends at block 1620. Flow then proceeds to block 1340 of FIG. 13.

At block 1624, the storage controller 108 stores a zero value into the stream window lower LBA limit 932. Flow ends at block 1624. Flow then proceeds to block 1340 of FIG. 13.

Referring now to FIG. 17, a flowchart illustrating a move window adjustment process in accordance with embodiments of the present invention is shown. The move window adjustment process determines if the upper and lower LBA limits 936, 940 for move windows 512 need to be adjusted based on LBAs 520 of host I/O requests 332. FIG. 17 shows in more detail the process described in block 1344 of FIG. 13. Flow begins at decision block 1704.

At decision block 1704, the storage controller 108 determines if the starting LBA address 524 of the received host I/O request 332 from block 1304 is outside the move window 512 corresponding to the active stream window 508. If the starting LBA address 524 of the received host I/O request 332 from block 1304 is outside the move window 512 corresponding to the active stream window 508, then the move window 512 needs to be adjusted and flow proceeds to block 1708. If the starting LBA address 524 of the received host I/O request 332 from block 1304 is not outside the move window 512 corresponding to the active stream window 508, then the move window 512 does not need to change and flow ends. Flow then proceeds to block 1348 of FIG. 13.

At block 1708, the storage controller 108 subtracts the stream window lower LBA limit 932 from the stream window upper LBA limit 928 to obtain a stream window 508 size. Flow proceeds to block 1712.

At block 1712, the storage controller 108 divides the stream window 508 size by 2 and adds to the stream window lower LBA limit 932 to obtain the stream window center. Flow proceeds to decision block 1716.

At decision block 1716, the storage controller 108 determines if the starting LBA address 524 of the received host I/O request 332 is directly adjacent to the immediately previous host I/O request 332. Directly adjacent means the starting LBA address 524 of the received host I/O request 332 immediately follows the ending LBA address 532 of the immediately previous host I/O request 332. If the starting LBA address 524 of the received host I/O request 332 is directly adjacent to the immediately previous host I/O request 332, then flow proceeds to block 1720. If the starting LBA address 524 of the received host I/O request 332 is not directly adjacent to the immediately previous host I/O request 332, then flow proceeds to block 1724.

At block 1720, the storage controller 108 multiplies the stream window size 508 by a sequential stream window modifier to obtain a new move window size 512. The sequential stream window modifier is used when the starting LBA address 524 of the received host I/O request 332 is directly adjacent to the immediately previous host I/O request 332. In the preferred embodiment, the sequential stream window modifier is 0.5. In other embodiments, the sequential stream window modifier is either less than or more than 0.5. Flow proceeds to block 1728.

At block 1724, the storage controller 108 multiplies the stream window size 508 by a semi-sequential stream window modifier to obtain a new move window size 512. The semi-sequential stream window modifier is used when the starting LBA address 524 of the received host I/O request 332 is not directly adjacent to the immediately previous host I/O request 332. In the preferred embodiment, the semi-sequential stream window modifier is 0.4. In other embodiments, the sequential stream window modifier is either less than or more than 0.4. Flow proceeds to block 1728.

At block 1728, the storage controller 108 divides the new move window size 512 by 2 to obtain a half new move window size. Flow proceeds to blocks 1732 and 1740.

At block 1732, the storage controller 108 adds the half new move window size to the stream window center to obtain a new move window upper LBA limit. Flow proceeds to block 1736.

At block 1736, the storage controller 108 stores the new move window upper LBA limit in the move window upper LBA limit 936 in the stream metadata 912. Flow ends at block 1736.

At block 1740, the storage controller 108 subtracts the half new move window size from the stream window center to obtain a new move window lower LBA limit. Flow proceeds to block 1744.

At block 1744, the storage controller 108 stores the new move window lower LBA limit in the move window lower LBA limit 940 in the stream metadata 912. Flow ends at block 1744.

Although the process steps of the present invention describe the storage controller 108 performing the actions, it is understood by one of ordinary skill in the art that a CPU or processor 312 generally performs these steps. However, in other embodiments, one or more processors, state machines, programmable logic devices, or other devices may perform these steps.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A method comprising:
   in response to a storage controller receiving a host I/O request;
      determining, by the storage controller, if the host I/O request corresponds to an active stream;
      in response to the host I/O request corresponding to an active stream:
         updating, by the storage controller, an existing active list entry corresponding to the active stream of an active list corresponding to one logically addressed storage volume; and
         adjusting, by the storage controller, a move window corresponding to the existing active list entry, the move window being used to determine if stream window logical block address limits need to change; and
      in response to the host I/O request not corresponding to an active stream:
         converting, by the storage controller, an inactive list entry of an inactive list into a new active list entry of the active list; and
         configuring the new active list entry,
      the inactive list stores available but unallocated storage controller memory resources, the active list stores allocated storage controller memory resources and comprises an active list head at one end of the active list and an active list tail at an opposite end of the active list, the active list head corresponding to a most recently used active list entry and the active list tail corresponding to a least recently used active list entry.

2. The method of claim 1, wherein determining if the host I/O request corresponds to an active stream comprises:
   determining, by the storage controller, if the active list is empty;
   in response to the active list is empty then the host I/O request does not correspond to an active stream; and
   in response to the active list is not empty:
      searching the active list entries beginning from the head of the active list;
      identifying if an active list entry is within a stream window corresponding to the active list;
         in response to an active list entry is within the stream window, the host I/O request corresponds to an active stream;
         in response to an active list entry is not within the stream window, the host I/O request does not correspond to an active stream; and
      repeating searching and identifying until either an active list entry within a stream window is identified or the entire active list is searched without identifying an active list entry within the stream window, wherein the stream window comprises an LBA range between a stream window upper LBA limit and a stream window lower LBA limit.

3. The method of claim 2, wherein updating an existing active list entry of the active list corresponding to the active stream comprises:
   removing, by the storage controller, the existing active list entry from the active list;
   updating, by the storage controller, a time last hit corresponding to the existing active list entry, wherein the time last hit comprises a time stamp identifying when the host I/O request was received by the storage controller; and
   placing, by the storage controller, the existing active list entry to the head of the active list.

4. The method of claim 3, wherein the move window comprises an LBA range between a move window upper LBA limit and a move window lower LBA limit, wherein in response to the starting LBA of the host I/O request is outside the move window, the method further comprising:
   adjusting, by the storage controller, the move window upper and lower LBA limits using a sequential stream window modifier in response to the starting LBA of the host I/O request is directly adjacent to the immediately previous I/O request to the same stream as the host I/O request; and
   adjusting, by the storage controller, the move window upper and lower LBA limits using a semi-sequential stream window modifier in response to the starting LBA of the host I/O request is not directly adjacent to the immediately previous I/O request to the same stream as the host I/O request.

5. The method of claim 3, wherein converting the inactive list entry of the inactive list into the new active list entry of the active list comprises:
   determining, by the storage controller, if the inactive list is empty;
   in response to determining the inactive list is empty then:
      recycling, by the storage controller, one or more stale streams from the active list to the inactive list; and
   in response to determining the inactive list is not empty then:
      removing, by the storage controller, an inactive list entry from the inactive list.

6. The method of claim 5, wherein recycling one or more stale streams from the active list to the inactive list comprises:
   searching the active list entries beginning from the tail of the active list; and
   determining if the difference between a current time and the time last hit is less than a stream recycle time for a current active list entry being searched;
      in response to the difference between the current time and the time last hit is not less than the stream recycle time, then:
         selecting a next most recent active list entry from the tail of the active list in response to there are more active list entries in the active list; and
         repeating determining if the difference between the current time and the time last hit is less than the stream recycle time;
      in response to the difference between the current time and the time last hit is less than the stream recycle time, then:
         removing, by the storage controller, the current active list entry from the active list;
         initializing the time last hit and the stream window for the current active list entry to zero; and
         placing the current active list entry on the inactive list.

7. The method of claim 6, further comprising:
   maintaining, by the storage controller, an outstanding I/O count for each active list entry; and
   for each active list entry:

incrementing, by the storage controller, the outstanding I/O count corresponding to the active list entry when the storage controller receives a host I/O request corresponding to the active list entry;

decrementing, by the storage controller, the outstanding I/O count corresponding to the active list entry in response to a host I/O request corresponding to the active list entry completing;

starting, by the storage controller, a burst timer corresponding to the active list entry when the outstanding I/O count transitions from one to zero; and stopping, by the storage controller, the burst timer when the outstanding I/O count transitions from zero to one;

in response to stopping the burst timer:
   storing the burst timer value in a time since last burst queue location identified by a time since last burst pointer; and
   incrementing the time since last burst pointer to identify a next time since last burst queue location, wherein the storage controller maintains a time since last burst queue and time since last burst pointer for each active list entry, wherein the time since last burst queues are circular queues with a predetermined number of locations.

8. The method of claim 7, further comprising:
determining, by the storage controller, when a time since last burst queue is full,
wherein a time since last burst queue is full when each of the predetermined number of locations contains a non-zero time since last burst entry;
in response to a time since last burst queue is full:
   calculating, by the storage controller, the stream recycle time based on an average of the time since last burst queue locations; and
   saving, by the storage controller, the stream recycle time in a storage controller memory location.

9. The method of claim 8, wherein the stream recycle time is a weighted average that comprises a greater weighting applied to more recent time since last burst values and a lesser weighting applied to less recent time since last burst values.

10. A storage controller, comprising:
a memory, comprising:
   an active list storing allocated storage controller memory resources, comprising:
      an active list head at one end of the active list corresponding to a most recently used active list entry; and
      an active list tail at an opposite end of the active list corresponding to a least recently used active list entry; and
   an inactive list comprising a predetermined number of inactive list entries related to a size of the memory, the inactive list stores available but unallocated memory resources;
in response to the storage controller receiving a host I/O request, the storage controller determines if the host I/O request corresponds to an active stream;
in response to determining the active stream, the storage controller updates an existing active list entry corresponding to the active stream of the active list and adjusts a move window corresponding to the existing active list entry, the move window being used to determine if stream window logical block address limits need to change;

in response to not determining an active stream, the storage controller converts an inactive list entry of the inactive list into a new active list entry of the active list and configures the new active list entry.

11. The storage controller of claim 10, wherein the storage controller determines if the host I/O request corresponds to an active stream comprises the storage controller determines if the active list is empty, wherein in response to the active list is empty the host I/O request does not correspond to an active stream and in response to the active list is not empty, the storage controller searches the active list entries beginning from the head of the active list and identifies if an active list entry is within a stream window corresponding to the active list, wherein in response to an active list entry is within the stream window, the host I/O request corresponds to an active stream, wherein in response to an active list entry is not within the stream window, the host I/O request does not correspond to an active stream, wherein the storage controller repeats searching and identifying until either an active list entry within a stream window is identified or the entire active list is searched without identifying an active list entry within the stream window.

12. The storage controller of claim 11, wherein the storage controller updating an existing active list entry of the active list corresponding to the active stream comprises the storage controller removes the existing active list entry from the active list and updates a time last hit corresponding to the existing active list entry, wherein the time last hit comprises a time stamp identifying when the host I/O request was received by the storage controller, wherein the storage controller places the existing active list entry to the head of the active list.

13. The storage controller of claim 12, wherein the move window comprises an LBA range between a move window upper LBA limit and a move window lower LBA limit, wherein if the starting LBA of the host I/O request is outside the move window, the storage controller adjusts the move window upper and lower LBA limits using a sequential stream window modifier if the starting LBA of the host I/O request is directly adjacent to the immediately previous I/O request to the same stream as the host I/O request and adjusts the move window upper and lower LBA limits using a semi-sequential stream window modifier if the starting LBA of the host I/O request is not directly adjacent to the immediately previous I/O request to the same stream as the host I/O request.

14. The storage controller of claim 12, wherein the storage controller converts the inactive list entry of the inactive list into the new active list entry of the active list comprises the storage controller determines if the inactive list is empty, wherein in response to the inactive list is empty the storage controller recycles one or more stale streams from the active list to the inactive list, wherein in response to the inactive list is not empty the storage controller removes an inactive list entry from the inactive list.

15. The storage controller of claim 14, wherein the storage controller recycles one or more stale streams from the active list to the inactive list comprises the storage controller searches the active list entries beginning from the tail of the active list; and determines if the difference between a current time and the time last hit is less than a stream recycle time for a current active list entry being searched, wherein in response to the difference between the current time and the time last hit is not less than the stream recycle time, the storage controller selects a next most recent active list entry from the tail of the active list if there are more active list entries in the active list and repeats determines if the difference between the current time and the time last hit is less than the stream recycle time, wherein in response to the difference between the current time and the time last hit is less than the stream recycle time, the storage controller removes the current active list entry from the active list, initializes the time last hit and the stream window for the current active list entry to zero, and places the current active list entry on the inactive list.

16. The storage controller of claim 15, wherein the storage controller maintains an outstanding I/O count for each active list entry and for each active list entry increments the outstanding I/O count corresponding to the active list entry when the storage controller receives a host I/O request corresponding to the active list entry, decrements the outstanding I/O count corresponding to the active list entry in response to a host I/O request corresponding to the active list entry completing, starts a burst timer corresponding to the active list entry when the outstanding I/O count transitions from one to zero, and stops the burst timer when the outstanding I/O count transitions from zero to one, wherein in response to stopping the burst timer, the storage controller stores the burst timer value in a time since last burst queue location identified by a time since last burst pointer and increments the time since last burst pointer to identify a next time since last burst queue location, wherein the storage controller maintains a time since last burst queue and time since last burst pointer for each active list entry, wherein the time since last burst queues are circular queues with a predetermined number of locations.

17. The storage controller of claim 16, wherein the storage controller determines when a time since last burst queue is full, wherein a time since last burst queue is full if each of the predetermined number of locations contains a nonzero time since last burst entry, wherein when a time since last burst queue is full, the storage controller calculates the stream recycle time based on an average of the time since last burst queue locations and saves the stream recycle time in a storage controller memory location.

18. The storage controller of claim 17, the stream recycle time is a weighted average that comprises a greater weighting applied to more recent time since last burst values and a lesser weighting applied to less recent time since last burst values.

19. A system, comprising:
a storage controller, operable to receive host I/O requests, comprising:
   memory, comprising:
      an active list of entries, wherein each active list entry corresponds to allocated memory resources for different sequential I/O streams of host I/O requests, wherein each active list entry comprises:
         a time last hit, wherein the time last hit is a time stamp of a last received host I/O request directed to a sequential I/O stream; and
      an inactive list of entries, wherein each inactive list entry corresponds to available memory resources for new sequential I/O streams; and
   one or more storage devices, coupled to the storage controller, wherein in response to the storage controller receiving a host I/O request and determining the host I/O request does not correspond to a sequential I/O stream in the active list and there are no inactive list entries in the inactive list, the storage controller converts an existing active list entry into a new active list entry, wherein the new active list entry corresponds to the received host I/O request.

20. The system of claim 19, wherein the storage controller converts an existing active list entry into a new active list entry comprises the storage controller identifies at least one active list entry where the difference between the current time and the time last hit is less than a stream recycle time, wherein the storage controller calculates the stream recycle time based on the weighted average of a history of a predetermined number of the time last hit to the sequential I/O stream corresponding to the active list entry, wherein the storage controller converts the identified at least one active list entry into at least one new active list entry.

* * * * *